US010119388B2

(12) United States Patent
Bittar et al.

(10) Patent No.: US 10,119,388 B2
(45) Date of Patent: Nov. 6, 2018

(54) MODULAR GEOSTEERING TOOL ASSEMBLY

(75) Inventors: Michael S. Bittar, Houston, TX (US); Clive Menezes, Conroe, TX (US); Martin D. Paulk, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1627 days.

(21) Appl. No.: 13/524,158

(22) Filed: Jun. 15, 2012

(65) Prior Publication Data

US 2012/0249149 A1 Oct. 4, 2012

Related U.S. Application Data

(62) Division of application No. 12/306,267, filed as application No. PCT/US2007/015806 on Jul. 11, 2007, now Pat. No. 8,222,902.

(Continued)

(51) Int. Cl.
*G01V 3/00* (2006.01)
*E21B 47/026* (2006.01)
(Continued)

(52) U.S. Cl.
CPC .......... *E21B 47/026* (2013.01); *G01V 3/28* (2013.01); *H01Q 1/04* (2013.01); *H01Q 7/00* (2013.01); *H01Q 21/24* (2013.01)

(58) Field of Classification Search
CPC ........ G01V 3/00; G01V 3/28; G01R 33/5617; G01N 24/081; E21B 47/026; H01Q 1/04
(Continued)

(56) References Cited

U.S. PATENT DOCUMENTS 2,901,689 A 8/1959 Barrett
3,014,177 A 12/1961 Hungerford et al.
(Continued)

FOREIGN PATENT DOCUMENTS

AU 2007273026 4/2010
AU 2007349251 6/2011
(Continued)

OTHER PUBLICATIONS

European Office Action, dated Nov. 10, 2011, Appl No. 07810345.4, "Modular Geosteering Tool Assembly", filed Jan. 16, 2009, 5 pgs.
(Continued)

*Primary Examiner* — Melissa Koval
*Assistant Examiner* — Trung Nguyen
(74) *Attorney, Agent, or Firm* — Gilliam IP PLLC

(57) ABSTRACT

A retrievable tool for steering through an earth formation includes a first tool assembly and a tilted antenna attached to the first tool assembly. The tool also includes a second tool assembly attached to the first tool assembly and a tilted antenna attached to the second tool assembly. The first tool assembly attaches to the second tool assembly so that the antennas are tilted in predetermined directions. The tilted antennas are transmitter antennas or receiver antennas. Each tool assembly is a tubular cylinder with a longitudinal axis running the length of the cylinder, wherein the tubular cylinder has two ends, each end including a rotational attachment mechanism. The tool assemblies attach to each other through their rotational attachment mechanisms. The rotational attachment mechanism may be a screw-on mechanism, press-fit mechanism, or welded mechanism.

16 Claims, 6 Drawing Sheets

Related U.S. Application Data

(60) Provisional application No. 60/806,981, filed on Jul. 11, 2006.

(51) Int. Cl.
- *G01V 3/28* (2006.01)
- *H01Q 1/04* (2006.01)
- *H01Q 7/00* (2006.01)
- *H01Q 21/24* (2006.01)

(58) Field of Classification Search
USPC .................. 324/300–376, 600, 637–639
See application file for complete search history.

(56) References Cited

U.S. PATENT DOCUMENTS

| | | |
|---|---|---|
| 3,187,252 A | 6/1965 | Hungerford |
| 3,286,163 A | 11/1966 | Holser et al. |
| 3,305,771 A | 2/1967 | Arps |
| 3,408,561 A | 10/1968 | Redwine et al. |
| 3,412,815 A | 11/1968 | Holser |
| 3,510,757 A | 5/1970 | Huston |
| 3,539,911 A | 11/1970 | Youmans et al. |
| 3,561,007 A | 2/1971 | Gouilloud et al. |
| 3,808,520 A | 4/1974 | Runge |
| 3,982,176 A | 9/1976 | Meador |
| 4,209,747 A | 6/1980 | Huchital |
| 4,302,722 A | 11/1981 | Gianzero |
| 4,319,191 A | 3/1982 | Meador et al. |
| 4,360,777 A | 11/1982 | Segesman |
| 4,536,714 A | 8/1985 | Clark |
| 4,553,097 A | 11/1985 | Clark |
| 4,610,313 A | 9/1986 | Daley et al. |
| 4,611,173 A | 9/1986 | Bravenec et al. |
| 4,636,731 A | 1/1987 | Savage et al. |
| 4,651,101 A | 3/1987 | Barber et al. |
| 4,697,190 A | 9/1987 | Oswald |
| 4,700,142 A | 10/1987 | Kuckes |
| 4,746,973 A | 5/1988 | Ohsuga |
| 4,780,857 A | 10/1988 | Lyle et al. |
| 4,785,247 A | 11/1988 | Meador et al. |
| 4,791,373 A | 12/1988 | Kuckes |
| 4,808,929 A | 2/1989 | Oldigs |
| 4,810,970 A | 3/1989 | Warren et al. |
| RE32,913 E | 4/1989 | Clark |
| 4,845,433 A | 7/1989 | Kleinberg et al. |
| 4,873,488 A | 10/1989 | Barber et al. |
| 4,876,511 A | 10/1989 | Clark |
| 4,899,112 A | 2/1990 | Clark et al. |
| 4,933,640 A | 6/1990 | Kuckes |
| 4,940,943 A | 7/1990 | Bartel et al. |
| 4,945,987 A | 8/1990 | Wittrisch |
| 4,949,045 A | 8/1990 | Clark et al. |
| 4,962,490 A | 10/1990 | Lyle et al. |
| 4,968,940 A | 11/1990 | Clark et al. |
| 4,980,643 A | 12/1990 | Gianzero et al. |
| 5,089,779 A | 2/1992 | Rorden |
| 5,115,198 A | 5/1992 | Gianzero et al. |
| 5,160,925 A | 11/1992 | Dailey et al. |
| 5,200,705 A | 4/1993 | Clark et al. |
| 5,210,495 A | 5/1993 | Hapashy et al. |
| 5,230,386 A | 7/1993 | Wu et al. |
| 5,230,387 A | 7/1993 | Waters et al. |
| 5,239,448 A | 8/1993 | Perkins et al. |
| 5,241,273 A | 8/1993 | Luling |
| 5,243,290 A | 9/1993 | Safinya |
| 5,260,662 A | 11/1993 | Rorden |
| 5,278,507 A | 1/1994 | Bartel et al. |
| 5,329,448 A | 7/1994 | Rosthal |
| 5,332,048 A | 7/1994 | Underwood et al. |
| 5,343,152 A | 8/1994 | Kuckes |
| 5,355,088 A | 10/1994 | Howard |
| 5,389,881 A | 2/1995 | Bittar et al. |
| 5,402,068 A | 3/1995 | Meador et al. |
| 5,424,293 A | 6/1995 | Sinclair et al. |
| 5,428,293 A | 6/1995 | Sinclair et al. |
| 5,442,294 A | 8/1995 | Rorden |
| 5,448,227 A | 9/1995 | Orban et al. |
| 5,475,309 A | 12/1995 | Hong et al. |
| 5,485,089 A | 1/1996 | Kuckes |
| 5,501,285 A | 3/1996 | Lamine et al. |
| 5,508,616 A | 4/1996 | Sato et al. |
| 5,530,358 A | 6/1996 | Wisler et al. |
| 5,550,473 A | 8/1996 | Klein |
| 5,563,512 A | 10/1996 | Mumby |
| 5,585,790 A | 12/1996 | Luling |
| 5,589,775 A | 12/1996 | Kuckes |
| 5,594,343 A | 1/1997 | Clark et al. |
| 5,602,541 A | 2/1997 | Comeau et al. |
| 5,656,930 A | 8/1997 | Hagiwara |
| 5,720,355 A | 2/1998 | Lamine et al. |
| 5,725,059 A | 3/1998 | Kuckes et al. |
| 5,757,191 A | 5/1998 | Gianzero |
| 5,781,436 A | 7/1998 | Forgang et al. |
| 5,813,480 A | 9/1998 | Zaleski, Jr. et al. |
| 5,854,991 A | 12/1998 | Gupta et al. |
| 5,864,058 A | 1/1999 | Chen-Kang |
| 5,869,968 A | 2/1999 | Brooks et al. |
| 5,886,526 A | 3/1999 | Wu |
| 5,892,460 A | 4/1999 | Jerabek et al. |
| 5,923,170 A | 7/1999 | Kuckes |
| 5,999,883 A | 12/1999 | Gupta et al. |
| 6,044,325 A | 3/2000 | Chakravarthy et al. |
| 6,057,784 A | 5/2000 | Schaaf et al. |
| 6,084,826 A | 7/2000 | Leggett, III |
| 6,147,496 A | 11/2000 | Strack et al. |
| 6,150,822 A | 11/2000 | Hong et al. |
| 6,158,532 A * | 12/2000 | Logan et al. .................. 175/320 |
| 6,163,155 A | 12/2000 | Bittar |
| 6,181,138 B1 | 1/2001 | Hagiwara et al. |
| 6,188,222 B1 | 2/2001 | Seydoux et al. |
| 6,191,586 B1 | 2/2001 | Bittar |
| 6,206,108 B1 | 3/2001 | MacDonald et al. |
| 6,218,841 B1 | 4/2001 | Wu |
| 6,218,842 B1 | 4/2001 | Bittar |
| 6,230,822 B1 | 5/2001 | Sullivan et al. |
| 6,297,639 B1 | 10/2001 | Clark et al. |
| 6,304,086 B1 | 10/2001 | Minerbo et al. |
| 6,351,127 B1 | 2/2002 | Rosthal et al. |
| 6,353,321 B1 | 3/2002 | Bittar |
| 6,359,438 B1 | 3/2002 | Bittar |
| 6,373,254 B1 | 4/2002 | Dion et al. |
| 6,466,020 B2 | 10/2002 | Kuckes et al. |
| 6,476,609 B1 * | 11/2002 | Bittar ....................... G01V 3/30 175/45 |
| 6,538,447 B2 | 3/2003 | Bittar |
| 6,540,033 B1 | 4/2003 | Sullivan et al. |
| 6,541,979 B2 | 4/2003 | Omeragic |
| 6,543,312 B2 | 4/2003 | Sullivan et al. |
| 6,556,014 B1 | 4/2003 | Kong et al. |
| 6,566,881 B2 | 5/2003 | Omeragic et al. |
| 6,571,886 B1 | 6/2003 | Sullivan |
| 6,573,722 B2 | 6/2003 | Rosthal et al. |
| 6,584,408 B2 | 6/2003 | Omeragic |
| 6,614,229 B1 | 9/2003 | Clark et al. |
| 6,626,251 B1 | 9/2003 | Sullivan et al. |
| 6,648,082 B2 | 11/2003 | Schultz et al. |
| 6,691,802 B2 | 2/2004 | Schultz et al. |
| 6,693,430 B2 | 2/2004 | Rosthal et al. |
| 6,698,536 B2 | 3/2004 | Moran et al. |
| 6,710,600 B1 | 3/2004 | Kopecki et al. |
| 6,727,706 B2 | 4/2004 | Gao et al. |
| 6,736,222 B2 | 5/2004 | Kuckes et al. |
| 6,777,940 B2 * | 8/2004 | Macune ................... G01V 3/30 324/335 |
| 6,778,127 B2 | 8/2004 | Stolarczyik et al. |
| 6,788,065 B1 | 9/2004 | Homan et al. |
| 6,810,331 B2 | 10/2004 | Bittar et al. |
| 6,814,162 B2 | 11/2004 | Moran et al. |
| 6,850,068 B2 | 2/2005 | Chemali et al. |
| 6,863,127 B2 | 3/2005 | Clark et al. |
| 6,885,943 B2 | 4/2005 | Bittar et al. |
| 6,900,640 B2 | 5/2005 | Fanini et al. |
| 6,911,824 B2 | 6/2005 | Bittar |

(56) References Cited

U.S. PATENT DOCUMENTS

| | | |
|---|---|---|
| 6,944,546 B2 | 9/2005 | Xiao et al. |
| 6,958,610 B2 | 10/2005 | Gianzero |
| 6,998,844 B2 | 2/2006 | Omeragic et al. |
| 7,017,662 B2 | 3/2006 | Schultz et al. |
| 7,019,528 B2 | 3/2006 | Bittar |
| 7,038,455 B2 | 5/2006 | Beste et al. |
| 7,046,010 B2 | 5/2006 | Hu et al. |
| 7,066,280 B2 | 6/2006 | Sullivan et al. |
| 7,091,877 B2 | 8/2006 | Barber |
| 7,098,664 B2 | 8/2006 | Bittar et al. |
| 7,098,858 B2 | 8/2006 | Bittar et al. |
| 7,138,803 B2 | 11/2006 | Bittar |
| 7,202,670 B2 | 4/2007 | Omeragic et al. |
| 7,207,215 B2 | 4/2007 | Spross et al. |
| 7,227,363 B2 | 6/2007 | Gianzero et al. |
| 7,265,552 B2 | 9/2007 | Bittar |
| 7,296,462 B2 | 11/2007 | Gregory et al. |
| 7,316,277 B2 | 1/2008 | Jeffryes |
| 7,345,487 B2 | 3/2008 | Bittar et al. |
| 7,350,568 B2 | 4/2008 | Mandal et al. |
| 7,394,257 B2 | 7/2008 | Martinez et al. |
| 7,427,863 B2 | 9/2008 | Bittar |
| 7,536,261 B2 | 5/2009 | Omeragic et al. |
| 7,557,579 B2 | 7/2009 | Bittar |
| 7,557,580 B2 | 7/2009 | Bittar |
| 7,557,582 B2 | 7/2009 | Moore |
| 7,612,565 B2 | 11/2009 | Seydoux et al. |
| 7,657,377 B2 | 2/2010 | Sinclair et al. |
| 7,659,722 B2 | 2/2010 | Bittar |
| 7,746,078 B2 | 6/2010 | Bittar et al. |
| 7,775,276 B2 | 8/2010 | Pelletier et al. |
| 7,786,731 B2 | 8/2010 | Cole et al. |
| 7,786,733 B2 | 8/2010 | Seydoux et al. |
| 7,839,148 B2 | 11/2010 | Vehra et al. |
| 7,839,346 B2 | 11/2010 | Bittar et al. |
| 7,848,887 B2 | 12/2010 | Yang et al. |
| 7,924,013 B2 | 4/2011 | Seydoux et al. |
| 7,948,238 B2 | 5/2011 | Bittar |
| 8,016,053 B2 | 9/2011 | Menezes et al. |
| 8,030,937 B2 | 10/2011 | Hu et al. |
| 8,085,049 B2 | 12/2011 | Bittar et al. |
| 8,085,050 B2 | 12/2011 | Bittar et al. |
| 8,222,902 B2 | 7/2012 | Bittar et al. |
| 8,264,228 B2 | 9/2012 | Bittar et al. |
| 8,347,985 B2 | 1/2013 | Bittar et al. |
| 8,433,518 B2 * | 4/2013 | Omeragic et al. ........ 702/7 |
| 8,593,147 B2 | 11/2013 | Bittar |
| 8,736,270 B2 | 5/2014 | Seydoux et al. |
| 9,157,315 B2 | 10/2015 | Bittar et al. |
| 9,329,298 B2 | 5/2016 | Bittar et al. |
| 9,465,132 B2 | 10/2016 | **Bittar |
| 2003/0018433 A1 | 1/2003 | Blanch et al. |
| 2003/0023381 A1 | 1/2003 | San Martin |
| 2003/0051914 A1 | 3/2003 | Bittar |
| 2003/0055565 A1 | 3/2003 | Omeragic |
| 2003/0062197 A1 | 4/2003 | Moran et al. |
| 2003/0076107 A1 | 4/2003 | Fanini et al. |
| 2003/0090424 A1 | 5/2003 | Brune et al. |
| 2003/0184302 A1 | 10/2003 | Omeragic et al. |
| 2003/0229449 A1 | 12/2003 | Merchant et al. |
| 2003/0229450 A1 | 12/2003 | Strickland |
| 2004/0027131 A1 | 2/2004 | Bittar |
| 2004/0059513 A1 | 3/2004 | Bittar et al. |
| 2004/0060708 A1 * | 4/2004 | Clark ............ E21B 47/01 166/380 |
| 2004/0061622 A1 | 4/2004 | Clark |
| 2004/0090234 A1 | 5/2004 | Macune |
| 2004/0140809 A1 | 7/2004 | Mercer |
| 2004/0145503 A1 | 7/2004 | Blanch et al. |
| 2004/0196047 A1 | 8/2004 | Fanini et al. |
| 2004/0183538 A1 | 9/2004 | Hanstein |
| 2005/0006090 A1 | 1/2005 | Chemali et al. |
| 2005/0024060 A1 | 2/2005 | Bittar |
| 2005/0083063 A1 | 4/2005 | Omeragic et al. |
| 2005/0099184 A1 | 5/2005 | Gianzero et al. |
| 2005/0134280 A1 | 6/2005 | Bittar et al. |
| 2005/0140373 A1 | 6/2005 | Li et al. |
| 2005/0211469 A1 | 9/2005 | Kuckes et al. |
| 2005/0218898 A1 | 10/2005 | Fredette et al. |
| 2005/0251342 A1 | 11/2005 | Market et al. |
| 2006/0011385 A1 | 1/2006 | Seydoux et al. |
| 2006/0015256 A1 | 1/2006 | Hassan et al. |
| 2006/0022887 A1 | 2/2006 | Bittar |
| 2006/0038571 A1 | 2/2006 | Ostermeier |
| 2006/0102353 A1 | 5/2006 | Storm et al. |
| 2006/0125479 A1 | 6/2006 | Chemali et al. |
| 2006/0244455 A1 | 11/2006 | Bittar |
| 2006/0255811 A1 | 11/2006 | Bittar et al. |
| 2006/0272859 A1 | 12/2006 | Pastusek et al. |
| 2007/0075455 A1 | 4/2007 | Marini et al. |
| 2007/0079989 A1 | 4/2007 | Bankston et al. |
| 2007/0278008 A1 | 6/2007 | Kuckes et al. |
| 2007/0186639 A1 | 8/2007 | Spross et al. |
| 2007/0205021 A1 | 9/2007 | Pelletier et al. |
| 2007/0229082 A1 | 10/2007 | Vehra et al. |
| 2007/0235225 A1 | 10/2007 | Bittar |
| 2007/0272442 A1 | 11/2007 | Pastusek et al. |
| 2008/0000686 A1 | 1/2008 | Kuckes et al. |
| 2008/0018895 A1 | 1/2008 | Opsal |
| 2008/0078580 A1 | 4/2008 | Bittar |
| 2008/0136419 A1 | 6/2008 | Seydoux et al. |
| 2008/0143336 A1 | 6/2008 | Legendre et al. |
| 2008/0173481 A1 | 7/2008 | Menezes et al. |
| 2008/0252296 A1 | 10/2008 | Hu et al. |
| 2008/0297161 A1 | 12/2008 | Gorek |
| 2008/0315884 A1 | 12/2008 | Bittar et al. |
| 2009/0015260 A1 | 1/2009 | Bittar |
| 2009/0045973 A1 | 2/2009 | Rodney et al. |
| 2009/0224764 A1 | 9/2009 | Bittar |
| 2009/0230968 A1 | 9/2009 | Bittar et al. |
| 2009/0278543 A1 | 11/2009 | Beste et al. |
| 2009/0302851 A1 | 12/2009 | Bittar et al. |
| 2009/0309798 A1 | 12/2009 | Bittar et al. |
| 2011/0019501 A1 | 1/2011 | Market |
| 2011/0221443 A1 | 9/2011 | Bittar et al. |
| 2011/0234230 A1 | 9/2011 | Bittar et al. |
| 2011/0251794 A1 | 10/2011 | Bittar et al. |
| 2011/0309835 A1 | 12/2011 | Barber et al. |
| 2012/0306500 A1 | 12/2012 | Bittar et al. |
| 2016/0370490 A1 | 12/2016 | Bittar |

FOREIGN PATENT DOCUMENTS

| | | |
|---|---|---|
| AU | 2008348131 | 11/2011 |
| CA | 2415563 | 1/2002 |
| EP | 527089 | 2/1993 |
| EP | 0553908 | 4/1993 |
| EP | 0556114 | 8/1993 |
| EP | 0654687 | 5/1995 |
| EP | 0814349 A2 | 12/1997 |
| EP | 0840142 A2 | 5/1998 |
| EP | 093519 | 7/1999 |
| EP | 2116871 | 11/2009 |
| EP | 1315984 | 1/2011 |
| EP | 1155343 | 3/2011 |
| EP | 2108981 | 5/2011 |
| EP | 2110687 | 8/2011 |
| FR | 2 699 286 | 6/1994 |
| GB | 2 279 149 | 12/1994 |
| GB | 2279149 | 12/1994 |
| GB | 2468734 | 9/2010 |
| NO | 331402 | 12/2011 |
| RU | 2043656 | 9/1995 |
| RU | 2107313 | 3/1998 |
| RU | 2279697 | 10/2003 |
| RU | 2305300 | 8/2007 |
| SG | 147870 | 8/2011 |
| WO | WO-9531736 | 11/1995 |
| WO | WO-98/00733 | 1/1998 |
| WO | WO9800733 | 1/1998 |
| WO | WO-98/45733 | 10/1998 |
| WO | WO-00/41006 | 7/2000 |
| WO | WO-0050926 | 8/2000 |
| WO | WO0155748 | 8/2001 |

(56) References Cited

FOREIGN PATENT DOCUMENTS

| WO | 2002/004986 | 1/2002 |
|---|---|---|
| WO | WO-03/069120 | 8/2003 |
| WO | WO-2006/011927 | 2/2006 |
| WO | 2007/149146 | 12/2007 |
| WO | WO-2007/145859 | 12/2007 |
| WO | WO-2007/7149106 | 12/2007 |
| WO | WO-2008/021868 | 2/2008 |
| WO | WO-2008/115229 | 9/2008 |
| WO | WO-2009029517 | 3/2009 |
| WO | WO-2009/073008 | 6/2009 |

OTHER PUBLICATIONS

Korean Final Rejection, dated Sep. 27, 2011, Application No. 10-2009-7002832, "Modular Geosteering Tool Assembly" filed Feb. 11, 2009, 3 pgs.
U.S. Non-Final Office Action, dated Sep. 26, 2011, U.S. Appl. No. 12/294,557, "Antenna Coupling Component Measurement Tool Having a Rotating Antenna Configuration", filed Sep. 25, 2008, 9 pgs.
U.S. Final Office Action, dated Oct. 15, 2010, U.S. Appl. No. 12/467,427, "Electromagnetic Wave Resistivity Tool Having a Tilted Antenna for Determining the Horizontal and Vertical Resistivities and Relative Dip Angle in Anisotropic Earth Formations", filed May 18, 2009, 24 pgs.
U.S. Non-Final Office Action, dated Mar. 5, 2012, U.S. Appl. No. 12/679,502, "Mulitmodal Geosteering Systems and Methods", filed Apr. 25, 2008, 14 pgs.
U.S. Non-Final Office Action, dated Mar. 13, 2012, U.S. Appl. No. 12/294,557, "Antenna Coupling Component Measurement Tool Having a Rotating Antenna Configuration", filed Sep. 25, 2008, 6 pgs.
U.S. Non-Final Office Action, dated Apr. 16, 2012, U.S. Appl. No. 12/689,435, "Tool for Azimuthal Resistivity Measurement and Bed Boundary Detection", filed Jan. 19, 2010, 6 pgs.
U.S. Non-Final Office Action, dated Oct. 15, 2010, U.S. Appl. No. 12/467,427, "Electromagnetic Wave Resistivity Tool Having a Tilted Antenna for Determining the Horizontal and Vertical Resistivities and Relative Dip Angle in Anisotropic Earth Formations", filed May 18, 2009, 39 pgs.
U.S. Notice of Allowance, dated Jun. 4, 2012, U.S. Appl. No. 12/306,954, "Method and Apparatus for Building a Tilted Antenna", filed Jul. 11, 2007, 4 pgs.
Australian First Examiner's Report, dated Mar. 5, 2010, Appl No. 2007349251, "Robust Inversion Systems and Methods for Azimuthally Sensitive Resistivity Logging Tools" filed Oct. 3, 2008, 2 pgs.
Australian First Examiner's Report, dated Sep. 7, 2011, Appl No. 2008365630, "Azimuthal At-Bit Resistivity and Geosteering Methods and Systems", filed Dec. 16, 2008, 2 pgs.
Austrian Examination Report, dated Nov. 16, 2011, Appl No. 12225, "EM-Guided Drilling Relative to an Existing Borehole", filed Nov. 26, 2008, 4 pgs.
Barriol, Yves et al., "The Pressures of Drilling and Production", Oilfield Review, Autumn 2005, pp. 22-41.
Bell, C. et al., "Navigating and Imaging in Complex Geology With Azimuthal Propagation Resistivity While Drilling", 2006 SPE Annual Technical Conference and Exhibition, SPE 102637, San Antonio, TX, USA, (Sep. 24, 2006),pp. 1-14.
Bittar, Michael S., "A New Azimuthal Deep-Reading Resistivity Tool for Geosteering and Advanced Formation Evaluation", 2007 SPE Annual Technical Conference and Exhibition, SPE 109971, Anaheim, CA, USA, (Nov. 11, 2007), pp. 1-9.
Bittar, Michael S., "Electromagnetic Wave Resistivity Tool Having a Tilted Antenna for Determining the Horizontal and Vertical Resistivities and Relative Dip Angle in Anisotropic Earth Formations", U.S. Appl. No. 09/238,832, filed Jan. 28, 1999, 32 pgs.
Bittar, Michael S., "Electromagnetic Wave Resistivity Tool Having a Tilted Antenna for Determining the Horizontal and Vertical Resistivities and Relative Dip Angle in Anisotropic Earth Formations", U.S. Appl. No. 12/127,634, filed May 28, 2008, 32 pgs.
Bittar, Michael S., "Electromagnetic Wave Resistivity Tool Having a Tilted Antenna for Determining the Horizontal and Vertical Resistivities and Relative Dip Angle in Anisotropic Earth Formations", U.S. Appl. No. 12/467,427, filed May 18, 2009, 30 pgs.
Bittar, Michael S., "Electromagnetic Wave Resistivity Tool Having a Tilted Antenna for Geosteering Within a Desired Payzone", U.S. Appl. No. 09/615,501, filed Jul. 13, 2000, 70 ps.
Bittar, Michael S., "Electromagnetic Wave Resistivity Tool Having a Tilted Antenna for Geosteering Within a Desired Payzone", U.S. Appl. No. 10/255,048, filed Sep. 25, 2002, 71 pgs.
Bittar, Michael S., "Electromagnetic Wave Resistivity Tool Having a Tilted Antenna for Geosteering Within a Desired Payzone", U.S. Appl. No. 10/616,429, filed Jul. 9, 2003, 71 pgs.
Bittar, Michael S., "Electromagnetic Wave Resistivity Tool Having a Tilted Antenna for Geosteering Within a Desired Payzone", U.S. Appl. No. 11/198,068, filed Aug. 5, 2005, 71 pgs.
Bittar, Michael S., "Electromagnetic Wave Resistivity Tool Having a Tilted Antenna for Geosteering Within a Desired Payzone", U.S. Appl. No. 11/457,709, filed Jul. 14, 2006, 70 pgs.
Bittar, Michael S., "Electromagnetic Wave Resistivity Tool Having a Tilted Antenna for Geosteering Within a Desired Payzone", U.S. Appl. No. 11/745,822, filed May 8, 2007, 20 pgs.
Bittar, Michael S., "Electromagnetic Wave Resistivity Tool Having a Tilted Antenna for Geosteering Within a Desired Payzone", U.S. Appl. No. 12/127,672, filed May 27, 2008, 44 pgs.
Bittar, Michael S., "Processing Resistivity Logs", U.S. Appl. No. 60/821,721, filed Aug. 8, 2006, 14 pgs.
Bittar, Michael S., "Electromagnetic Wave Resistivity Tool Having a Tilted Antenna for Geosteering Within a Desired Payzone", U.S. Appl. No. 12/467,434, filed May 18, 2009, 40 pgs.
Bittar, Michael S., "Resistivity Logging with Reduced Dip Artifacts", PCT Appl No. US2007/075455, filed Aug. 8, 2006, 17 pgs.
Bittar, Michael S. "Tool for Azimuthal Resistivity Measurement and Bed Boundary Detection", U.S. Appl. No. 60/821,988, filed Aug. 10, 2006, 12 pgs.
Bittar, Michael S. et al., "A 3D Borehole Imager and a Dielectric Measurement Tool", PCT Appl No. US09/65537, filed Nov. 23, 2009, 13 pgs.
Bittar, Michael S., et al., "A True Multiple Depth of Investigation Electromagnetic Wave Resistivity Sensor: Theory, Experiment, and Prototype Field Test Results", SPE 22705, 66th Annual Technical Conference and Exhibition of the SPE, Dallas, TX, (Oct. 6, 1991), pp. 1-8, plus 10 pgs of Figures.
Bittar, Michael S., et al., "Antenna Coupling Component Measurement Tool Having a Rotating Antenna Configuration", PCT Appl No. US06/062149, filed Dec. 15, 2006, 26 pgs.
Bittar, Michael S., et al., "Antenna Coupling Component Measurement Tool Having a Rotating Antenna Configuration", U.S. Appl. No. 12/294,557, filed Sep. 25, 2008, 22 pgs.
Bittar, Michael S., et al., "EM-Guided Drilling Relative to an Existing Borehole", U.S. Appl. No. 12/526,552, filed Aug. 10, 2009, 13 pgs.
Bittar, Michael S., et al., "Invasion Profiling with a Multiple Depth of Investigation, Electromagnetic Wave Resistivity Sensor", SPE 28425, 69th Annual Technical Conference and Exhibition of the SPE, New Orleans, LA, (Sep. 25, 1994),pp. 1-12, plus 11 pgs of Figures.
Bittar, Michael S., et al., "Look-Ahead Boundary Detection and Distance Measurement", U.S. Appl. No. 12/067,582, filed Mar. 20, 2008, 16 pgs.
Bittar, Michael S., et al., "Method and Apparatus for Building a Tilted Antenna", U.S. Appl. No. 12/306,954, filed Dec. 30, 2008, 13 pgs.
Bittar, Michael S., et al., "Method and Apparatus Having Antennas Configured to Measure Electrical Anisotropy", U.S. Appl. No. 12/088,061, filed Mar. 25, 2008, 16 pgs.
Bittar, Michael S., et al., "Method and Apparatus with High Resolution Electrode Configuration for Imaging in Oil-Based Muds", U.S. Appl. No. 12/680,868, filed Mar. 30, 2010, 16 pgs.
Bittar, Michael S., et al., "Modular Geosteering Tool Assembly", U.S. Appl. No. 12/306,267, filed Dec. 23, 2008, 16 pgs.

(56) References Cited

OTHER PUBLICATIONS

Bittar, Michael S., et al., "Multimodal Geosteering Systems and Methods", U.S. Appl. No. 12/679,502, filed Mar. 23, 2010, 20 pgs.
Bittar, Michael S., et al., "Robust Inversion Systems and Methods for Azimuthally Sensitive Resistivity Logging Tools", U.S. Appl. No. 12/229,760, filed Nov. 5, 2008, 15 pgs.
Bittar, Michael S., et al., "Systems and Methods for Displaying Logging Data", U.S. Appl. No. 12/295,158, filed Sep. 29, 2008, 15 pgs.
Bittar, Michael S., et al., "Systems and Methods Having Radially Offset Antennas for Electromagnetic Resistivity Logging", U.S. Appl. No. 12/300,876, filed Nov. 14, 2008, 16 pgs.
Bittar, Michael S., et al., "The Effects of Rock Anisotropy on MWD Electromagnetic Wave Resistivity Sensors", The Log Analyst, (Jan. 1996), pp. 20-30.
Bittar, Michael S., et al., "The Effects of Rock Anisotropy on MWD Electromagnetic Wave Resistivity Sensors", SPWLA 35th Annual Logging Symposium, (Jun. 19, 1994), 18 pgs.
Bonner, S. et al., "A New Generation of Electrode Resistivity Measurements for Formation Evaluation While Drilling", SPWLA 35th Annual Logging Symposium, (Jun. 19, 1994), pp. 1-19.
Bonner, Steve et al., "Measurements at the Bit: A New Generation of MWD Tools", Oilfield Review, (Apr. 1993), pp. 44-54.
Bonner, Steve et al., "Resistivity While Drilling—Images from the String", Oilfield Review, Spring 1996, pp. 4-19.
Canadian Office Action, dated Jan. 23, 2009, Application No. 2,415,563, "Electromagnetic Wave Resistivity Tool With a Tilted Antenna", filed Jan. 10, 2001, 3 pgs.
Canadian Office Action, dated Jan. 29, 2007, Application No. 2,415,563, "Electromagnetic Wave Resistivity Tool With a Tilted Antenna", filed Jul. 10, 2001, 4 pgs.
Canadian Office Action, dated Jun. 7, 2005, Application No. 2,415,563, "Electromagnetic Wave Resistivity Tool With a Tilted Antenna", filed Jul. 10, 2001, 2 pgs.
Canadian Office Action, dated Jul. 21, 2003, Appl No. 2,359,371, "Electromagnetic Wave Resistivity Tool Having a Tilted Antenna for Determining the Horizontal and Vertical Resistivities and Relative Dip Angle in Anisotropic Earth Formations", Jan. 24, 2000, 1 pg.
Canadian Office Action, dated Nov. 1, 2007, Application No. 2,415,563, "Electromagnetic Wave Resistivity Tool With a Tilted Antenna", filed Jan. 10, 2001, 5 pgs.
Chinese Office Action, dated Feb. 2, 2012, Appl No. 200780026363.0, "Modular Geosteering Tool Assembly", filed Jul. 11, 2007, 8 pgs.
Chinese Office Action, dated Feb. 16, 2012, Appl No. 200780024362.2, "Method and Apparatus for Building a Tilted Antenna", filed Jul. 11, 2007, 5 pgs.
Chinese Office Action, dated Feb. 28, 2012, Appl No. 200880007526.5, "EM-Guided Drilling Relative to an Existing Borehole", filed Jan. 18, 2008, 9 pgs.
Chinese Office Action, dated Mar. 10, 2011, Appl No. 200780024362.2, "Method and Apparatus for Building a Tilted Antenna", filed Dec. 29, 2008, 13 pgs.
Chinese Office Action, dated May 14, 2012, Appl No. 200680054943.6, "Antenna Coupling Component Measurement Tool Having a Rotating Antenna Configuration", filed Dec. 15, 2006, 7 pgs.
Chinese Office Action, dated Jul. 12, 2011, Appl No. 200680054943.6, "Antenna Coupling Component Measurement Tool Having a Rotating Antenna Configuration", filed Dec. 9, 2008, 13 pgs.
Chou, Lawrence et al., "Steering Toward Enhanced Production", Oilfield Review, Autumn 2006, pp. 54-63.
Clark, Brian et al., "A Dual Depth Resistivity Measurement for Fewd", SPWLA 29th Annual Logging Symposium, (Jun. 1988), 25 pgs.
Clark, Brian et al., "Electromagnetic Propagation Logging While Drilling: Theory and Experiment", SPE Formation Evaluation, (Sep. 1990), pp. 263-271.

EP Non-Final Office Action, dated Dec. 30, 2009, Appl No. 01 962 294.03, Electromagnetic Wave Resistivity Tool Having a Tilted Antenna for Geosteering Within a Desired Payzone, filed Jul. 1, 2001, 3 pgs.
European Office Action, dated Jul. 17, 2006, Appl No. 01962294.3, "Electromagnetic Wave Resistivity Tool Having a Tilted Antenna for Determining the Horizontal and Vertical Resistivities and Relative Dip Angle in Anisotropic Earth Form . . .", filed Jul. 10, 2001, 2 pgs.
European Office Action, dated Apr. 29, 2008, Application No. 00908351.0, "Electromagnetic Wave Resistivity Tool Having Tilted Antenna", filed Jan. 24, 2000, 5 pgs.
European Office Action, dated Jul. 17, 2006, Appl No. 01 096 294.3, Electromagnetic Wave Resistivity Tool Having a Tilted Antenna for Determining the Horizontal and Vertical Resistivities and Relative Dip Angle in Anisotropic Earth Formations, Jul. 10, 2001, 2 pgs.
European Office Action, dated Jul. 31, 2007, Appl No. 00908351.0, "Electromagnetic Wave Resistivity Tool Having a Tilted Antenna for Determining the Horizontal and Vertical Resistivities and Relative Dip Angle in Anisotropic Earth Formations" filed Jan. 24, 2000, 5 pgs.
European Office Action, dated Jul. 31, 2007, Application No. 00908351.0, "Electromagnetic Wave Resistivity Tool Having Tilted Antenna", filed Jan. 24, 2000, 42 pgs.
European Office Action, dated Sep. 3, 2010, Appl No. 09166567.9, Electromagnetic Wave Resistivity Tool Having a Tilted Antenna, filed Jul. 28, 2009, 4 pgs.
European Office Action, dated Sep. 13, 2007, Appl No. 01962294.3, "Electromagnetic Wave Resistivity Tool Having a Tilted Antenna for Determining the Horizontal and Vertical Resistivities and Relative Dip Angle in Anisotropic Earth Formations", filed Jul. 10, 2001, 4 pgs.
European Office Action, dated Sep. 23, 3008, Appl No. 01096 294.3, Electromagnetic wave resistivity tool having a tilted antenna for determining the horizontal and vertical resistivities and relative dip angle in anisotropic earth formations Jul. 10, 2001, 4 pgs.
European Search Report, dated May 30, 2011, Appl No. 07810345.4, "Modular Geosteering Tool Assembly", filed Jan. 16, 2009, 6 pgs.
European Search Report, dated Sep. 25, 2009, Appl No. 09166566.1, "Electromagnetic Wave Resistivity Tool Having a Tilted Antenna for Determining the Horizontal and Vertical Resistivities and Relative Dip Angle in Anisotropic Earth Formations", filed Jul. 28, 2009, 7 pgs.
European Search Report, dated Oct. 16, 2009, Appl No. 09166567.9, Electromagnetic Wave Resistivity Tool Having a Tilted Antenna, filed Jul. 28, 2009, 5 pgs.
European Search Report, dated Nov. 17, 2009, Appl No. 09166404.5, "Electromagnetic Wave Resistivity tool Having a Tilted Antenna for Determining the Horizontal and Vertical Resistivities and Relative Dip Angle in Anisotropic Earth Formations", filed Jul. 24, 2009, 4 pgs.
European Search Report, dated Nov. 20, 2009, Appl No. 09166405.2, "Electromagnetic Wave Resistivity Tool Having a Tilted Antenna for Determining the Horizontal and Vertical Resistivities and Related Dip Angle in Anisotropic Earth Formations", filed Jul. 24, 2009, 6 pgs.
European Search Report, dated Nov. 23, 2010, Application No. 07810315.7, "Method and Apparatus for Building a Tilted Antenna", filed Dec. 3, 2008, 9 pgs.
European Search Report, dated Dec. 14, 2009, Appl No. 09166566.1, "Electromagnetic Wave Resistivity Tool Having a Tilted Antenna for Determining the Horizontal and Vertical Resistivities and Relative Dip Angle in Anisotropic Earth Formations", filed Jul. 28, 2009, 9 pgs.
European Supplemental Search Report, dated Jun. 12, 2003 Appl No. 00908351.0, "Electromagnetic Wave Resistivity Tool Having a Tilted Antenna for Determining the Horizontal and Vertical Resistivities and Relative Dip Angle in Anisotropic Earth Formations", Jan. 24, 2000, 2 pgs.
Eurpoean Office Action, dated Sep. 27, 2005, Appl No. 01962294.3, "Electromagnetic Wave Resistivity Tool Having a Tilted Antenna

(56) References Cited

OTHER PUBLICATIONS for Determining the Horizontal and Vertical Resistivities and Relative Dip Angle in Anisotropic Earth Formations", filed Jul. 10, 2001, 5 pgs.

Finger, J. T., et al., "Development of a System for Diagnostic-While-Drilling (DWD)", SPE/IADC Drilling Conference, SPE/IADC 79884, Amsterdam, The Netherlands, (Feb. 19, 2003), 9 pgs.

Gianzero, Stanley et al., "Method and Apparatus Having Antennas Configured to Measure Electrical Anisotropy", U.S. Appl. No. 10/173,528, filed Jun. 17, 2002, 24 pgs.

Gianzero, Stanley et al., "Method and Apparatus Having Antennas Configured to Measure Electrical Anisotropy", U.S. Appl. No. 10/957,415, filed Oct 1, 2004, 27 pgs.

Hagiwara, T. "A New Method to Determine Horizontal-Resistivity in Anisotropic Formations Without Prior Knowledge of Relative Dip", 37th Annual Spwla Logging Symposium, New Orleans, LA, (Jun. 16, 1996), pp. 1-5, plus 3 pgs of Figs.

Halliburton Energy Services, Inc, "Sperry Drilling Services Facilities", Houston, TX, www.Halliburton.com, (Nov. 11, 2008), pp. 1-5.

Hayes, Dan "Steering into New Horizons", E&P Magazine, http://www.epmag.com/archives/print/4052.htm, (Jun. 1, 2000), pp. 1-3.

Indonesian Examination Report, dated May 2012, Appl No. W00 2009 03404, "EM-Guided Drilling Relative to an Existing Borehole", filed Jan. 18, 2008, 2 pgs.

Indonisia First Office Action, dated Sep. 2009, Appl No. WOO200803740, Method and Apparatus for Building a Tilted Antenna, filed Nov. 19, 2008, 2 pgs.

Int'l Search Report and Written Opinion, dated Oct. 8, 2009, Appl No. PCT/US09/053354, "A High Frequency Dielectric Measurement Tool", filed Aug. 11, 2009, 11 pgs.

Japanese Office Action, dated May 17, 2011, Application No. 2009-519509, "Modular Geosteering Tool Assembly", filed Jan. 13, 2009, (Atty Dkt No. 1391683.05), 2 pgs.

Korean Final Rejection, dated Sep. 27, 2011, Application Nol. 10-20097002832, "Modular Geosteering Tool Assembly" filed Feb. 11, 2009, (Atty. Dkt No. 1391-683.07), 3 pgs.

Korean Office Action, dated Feb. 01, 2011, Appl No. Oct. 2009-7002832, "Modular Geosteering Tool Assembly", filed Feb. 11, 2009 (Atty Dkt No. 1391683.07), 10 pgs.

Li, Qiming et al., "New Directional Electromagnetic Tool for Proactive Geosteering and Accurate Formation Evaluation While Drilling", Spwla 46th Annual Logging Symposium, New Orleans, La, Usa, (Jun. 26, 2005), 16 pgs.

Li, Qiming et al., "New Directional Electromagnetic Tool for Proactive Geosteering and Accurate Formation Evaluation While Drilling", Spwla 46th Annual Logging Symposium, Paper Uu, Jun. 26-29, 2005, pgs. 1-16.

Luling, M. et al., "Processing and Modeling 2-MHz Resistivity Tools in Dipping, Laminated, Anisotropic Formations: Spwla", Spwla 35th Annual Logging Symposium, paper Qq, (1994), pgs. 1-25.

Luling, Martin et al., "Processing and Modeling 2-MHz Resistivity Tools", Spwla 35th Annual Logging Symposium, Paper Qq, Jun. 19-22, 1994, pgs. 125.

Mack, S. G., et al., "Mwd Tool Accurately Measures Four Resistivities", Oil & Gas Journal, (May 25, 1992), pgs. 1-5.

Malaysian Office Action, dated Nov. 30, 2010, Appl No. 032599, "Robust Inversion Systems and Methods for Azimuthally Sensitive Resistivity Logging Tools" filed Oct. 15, 2008, (Atty No. 1391-714.05), 2 pgs.

Malaysian Search Report, dated Nov. 30, 2010, Appl No. 032599, "Robust Inversion Systems and Methods for Azimuthally Sensitive Resistivity Logging Tools" filed Oct. 15, 2008, (Atty No. 1391-714.05), 1 pg.

Mechetin, V. F., et al., "Temp - a New Dual Electromagnetic and Laterolog Apparatus - Technological Complex", All-Union Research Logging Institute, Ufa, Ussr. Ch. Ostrander, Petro Physics Intl, Dallas, Texas, Usa, (Date Unkn), 17 pgs.

Meyer, W. H., "New Two Frequency Propagation Resistivity Tools", Spwla 36th Annual Logging Symposium, (06/26/29/1995),12 pgs.

Moran, J. H. et al., "Effects of formation anisotropy on resistivity-logging measurements", Geophysics, vol. 44, No. 7 (Jul. 1979): p. 1266-1286, 21 Figs., 4 Tables, 21 pgs.

No Office Action, dated Apr. 3, 2009, Application No. 2001 3707, "Electromagnetic Wave Resistivity Tool Having a Tilted Antenna for Determining the Horizontal and Vertical Resistivities and Relative Dip Angle in Anisotropic Earth Formations", filed Jan 24, 2000, 5 pgs.

PCT International Prelimary Report on Patentability, dated May 10, 2012, Appl No. PCT/US08/87021, Azimuthal At-Bit Resistivity and Geosteering Methods and Systems, filed Dec. 16, 2008, 13 pgs.

PCT International Preliminary Examination Report, dated Nov. 4, 2002, Appl No. PCT/US01/41319 "Electromagnetic Wave Resistivity Tool Having a Tilted Antenna for Geosteering Within a Desired Payzone", filed Jul. 10, 2001, 30 pgs.

PCT International Preliminary Report on Patentability and Written Opinion, dated Nov. 4, 2010, Appl No. PCT/US08/61571 "Multimodal Geosteering Systems and Methods ", filed Apr. 25, 2008, 7 pgs.

PCT International Preliminary Report on Patentability, dated Apr. 30, 2008, Appl No. PCT/US06/62149, "Antenna Coupling Component Measurement Tool Having a Rotating Antenna Configuration", filed Dec. 15, 2006, 6 pgs.

PCT International Preliminary Report on Patentability, dated Oct. 1, 2009, Appl No. PCT/US07/064221, "Robust Inversion Systems and Methods for Azimuthally Sensitive Resistivity Logging Tools", filed Mar. 16, 2007, 2 pgs.

PCT International Search Report and Written Opinion, dated Feb. 10, 2009, Appl No. PCT/US08/87021, Azimuthal At-Bit Resistivity and Geosteering Methods and Systems, filed Dec. 16, 2008, 9 pgs.

PCT International Search Report and Written Opinion, dated May 15, 2000, Appl No. PCT/US00/01693, "Electromagnetic Wave Resistivity Tool Having a Tilted Antenna for Determining the Horizontal and Vertical Resistivities and Relative Dip Angle in Anisotropic Earth Formations", Jan. 24, 2000, 38 pgs.

PCT International Search Report and Written Opinion, dated Jun. 27, 2008, Appl No. PCT/US08/51447, EM-Guided Drilling Relative to an Existing Borehole, 8 pgs.

PCT International Search Report and Written Opinion, dated Aug. 15, 2008, Appl No. PCT/US08/61571, "Multimodal Geosteering Systems and Methods", filed Apr. 25, 2008, 8 pgs.

PCT International Search Report, dated Feb. 5, 2008, Appl No. PCT/US07/64221, "Robust Inversion Systems and Methods for Azimuthally Sensitive Resistivity Logging Tools", filed Mar. 16, 2007, 1 pg.

PCT International Search Report, dated Jan. 31, 2008, Appl No. PCT/US07/15806, "Modular Geosteering Tool Assembly", filed Jul. 11, 2007, 27 pgs.

PCT International Search Report, dated Feb. 27, 2008, Appl No. PCT/US07/75455, "Resistivity Logging with Reduced Dip Artifacts", filed Aug. 8, 2007, 18 pgs.

PCT International Search Report, dated Apr. 30, 2008, Appl No. PCT/US06/62149, "Antenna Coupling Component Measurement Tool Having a Rotating Antenna Configuration", filed Dec. 15, 2006, 3 pgs.

PCT International Search Report, dated May 15, 2002, Appl No. PCT/US00/01693, Electromagnetic Wave Resistivity Tool Having a Tilted Antenna for Determining the Horizontal and Vertical Resistivities and Relative Dip Angle in Anisotropic Earth Formations, Jan. 24, 2000, 4 pgs.

PCT International Search Report, dated May 15, 2008, Appl No. PCT/US07/15744, "Method and Apparatus for Building a Tilted Antenna", filed Jul. 11, 2007, 2 pgs.

PCT International Search Report, dated Sep. 18, 2001, Appl No. PCT/US01/41319 "Electromagnetic Wave Resistivity Tool Having a Tilted Antenna for Geosteering Within a Desired Payzone", filed Jul. 10, 2001, pp. 1-5.

PCT International Search Report, dated Sep. 18, 2001, Appl No. US01/41319, "Electromagnetic Wave Resistivity Tool Having a Tilted Antenna for Determining the Horizontal and Vertical Resistivities and Relative Dip Angle in Anisotropic Earth Formations", Aug. 6, 2002, 5 pgs.

PCT Written Opinion of the International Searching Authority, dated Feb. 5, 2008, Appl No. PCT/US07/64221, "Robust Inversion

(56) References Cited

OTHER PUBLICATIONS systems and Methods for Azimuthally Sensitive Resistivity Logging Tools", filed Mar. 16, 2007, 4 pgs.
PCT Written Opinion, dated Aug. 6, 2002, Appl No. PCT/US01/41319, "Electromagnetic Wave Resistivity Tool Having a Tilted Antenna for Geosteering Within a Desired Payzone", filed Jul. 10, 2001, 5 pgs.
Pitcher, J. et al., "A New Azimuthal Gamma at Bit Imaging Tool for Geosteering", SPE/IADC Drilling Conference and Exhibition, SPE/IADC 118328, Amsterdam, The Netherlands, (Mar. 17, 2009), pp. 1-8.
Preliminary Report on Patentability, dated Jul. 29, 2010, Appl No. PCT/US08/51447, "EM-Guided Drilling Relative to an Existing Borehole", filed Jan. 18, 2008, 7 pgs.
Roberts, T. S., et al., "Optimization of Pdc Drill Bit Performance Utilizing High-Speed, Real-Ti9me Downhole Data Acquired Under a Cooperative Research and Development Agreement", SPE/IADC Drilling Conference, SPE/IADC 91782, Amsterdam, The Netherlands, (Feb. 23, 2005), 14 pgs.
Rodney, Paul F., et al., "Electromagnetic Wave Resistivity MWD Tool", SPE Drilling Engineering, (Oct. 1986), pp. 37-346.
Russian Office Action, dated Jul. 9, 2009, Appl No. 2009104466, Modular Geosteering Tool Assembly, filed Feb. 10, 2009, 8 pgs.
Singapore Examination Report, dated Oct. 28, 2010, Application No. 200808573-0, "Method and Apparatus for Building a Tilted Antenna", filed Nov. 19, 2008, 6 pgs.
Singapore First Office Action, dated Apr. 11, 2009, Appl. No. 200808573-0, "Method and Apparatus for Building a Tilted Antenna", Filing Date Nov. 19, 2008, 8 pgs.
U.K. Examination Report, dated Aug. 19, 2011, Application No. 0914189.6, "EM-Guided Drilling Relative to an Existing Borehole", filed Aug. 13, 2009, 5 pgs.
U.K. Office Action, dated Feb. 6, 2012, Appl No. 0914189.6, "EM-Guided Drilling Relative to an Existing Borehole", filed Jan. 18, 2008, 3 pgs.
U.K. Office Action, dated May 10, 2012, Appl No. 1200502.1, "EM-Guided Drilling Relative to an Existing Borehole", filed Jan. 18, 2008, 2 pgs.
U.K. Search Report, dated Feb. 8, 2012, Appl No. 1200502.1, "EM-Guided Drilling Relative to an Existing Borehole", filed Jan. 18, 2008, 5 pgs.
U.S. Advisory Action, dated Apr. 13, 2007, U.S. Appl. No. 11/457,709, "Electromagnetic Wave Resistivity Tool Having a Tilted Antenna for Geosteering Within a Desired Payzone", filed Jul. 14, 2006, 3 pgs.
U.S. Advisory Action, dated Sep. 15, 2005, U.S. Appl. No. 10/616,429, "Electromagnetic Wave Resistivity Tool Having a Tilted Antenna for Geosteering Within a Desired Payzone", filed Jul. 9, 2003, 14 pgs.
U.S. Final Office Action, dated Jan. 19, 2007, U.S. Appl. No. 11/457,709, "Electromagnetic Wave Resistivity Tool Having a Tilted Antenna for Geosteering Within a Desired Payzone", filed Jul. 14, 2006, 31 pgs.
U.S. Final Office Action, dated Feb. 22, 2011, U.S. Appl. No. 12/689,435, "Tool for Azimuthal Resistivity Measurement and Bed Boundary Detection" filed Jan. 19, 2010, 10 pgs.
U.S. Final Office Action, dated Jun. 6, 2005, U.S. Appl. No. 10/616,429, "Electromagnetic Wave Resistivity Tool Having a Tilted Antenna for Geosteering Within a Desired Payzone", filed Jul. 9, 2003, 27 pgs.
U.S. Final Office Action, dated Jun. 16, 2004, U.S. Appl. No. 10/255,048, "Electromagnetic Wave Resistivity Tool Having a Tilted Antenna for Determining the Horizontal and Vertical Resistivities and Relative Dip Angle in Anisotropic Earth Formations", Sep. 25, 2002, 8 pgs.
U.S. Final Office Action, dated Jul. 7, 2011, U.S. Appl. No. 12/299,760, "Robust Inversion Systems and Methods for Azimuthally Sensitive Resistivity Logging Tools", filed Nov. 5, 2008, 16 pgs.
U.S. Final Office Action, dated Oct. 15, 2010, U.S. Appl. No. 12/467,427, "Electromagnetic Wave Resistivity Tool Having a Tilted Antenna for Determining the Horizontal and Vertical Resistivities and Relative Dip Angle in Anisotropic Earth Formations", May 18, 2009, 24 pgs.
U.S. Final Office Action, dated Oct. 22, 2010, U.S. Appl. No. 12/467,434, "Electromagnetic Wave Resistivity Tool Having a Tilted Antenna for Geosteering Within a Desired Payzone", filed May 18, 2009, 19 pgs.
U.S. Final Office Action, dated Nov. 17, 2011, U.S. Appl. No. 12/306,267, "Modular Geosteering Tool Assembly", filed Dec. 23, 2008, 14 pgs.
U.S. Final Office Action, dated Dec. 8, 2011, U.S. Appl. No. 12/306,954, "Method and Apparatus for Building a Tilted Antenna", filed Dec. 30, 2008, 17 pgs.
U.S. Non-Final Office Action, dated Jan. 27, 2012, U.S. Appl. No. 12/373,558, "Resistivity Logging with Reduced Dip Artifacts", filed Aug. 8, 2007, 17 pgs.
U.S. Non-Final Office Action, dated Feb. 16, 2011, U.S. Appl. No. 12/294,557, "Antenna Coupling Component Measurement Tool Having a Rotating Antenna Configuration", filed Sep. 25, 2008, 16 pgs.
U.S. Non-Final Office Action, dated Feb. 24, 2009, U.S. Appl. No. 12/127,634, "Electromagnetic Wave Resistivity Tool Having a Tilted Antenna for Determining the Horizontal and Vertical Resistivities and Relative Dip Angle in Anisotropic Earth Formations", filed May 27, 2008, 29 pgs.
U.S. Non-Final Office Action, dated Feb. 28, 2012, U.S. Appl. No. 12/919,426, "Azimuthal At-Bit Resistivity and Geosteering Methods and Systems", filed Dec. 16, 2008, 22 pgs.
U.S. Non-Final Office Action, dated Mar. 5, 2012, U.S. Appl. No. 12/679,502, "Multimodal Geosteering Systems and Methods", filed Apr. 25, 2008, 14 pgs.
U.S. Non-Final Office Action, dated Mar. 7, 2011, U.S. Appl. No. 12/467,434, "Electromagnetic Wave Resistivity Tool Having a Tilted Antenna for Geosteering Within a Desired Payzone", filed May 18, 2009, 14 pgs.
U.S. Non-Final Office Action, dated Mar. 15, 2010, U.S. Appl. No. 12/467,427, "Electromagnetic Wave Resistivity Tool Having a Tilted Antenna for Determining the Horizontal and Vertical Resistivities and Relative Dip Angle in Anisotropic Earth Formations", filed May 18, 2009, 25 pgs.
U.S. Non-Final Office Action, dated Apr. 26, 2000, U.S. Appl. No. 09/23,832, "Electromagnetic Wave Resistivity Tool Having a Tilted Antenna for Determining the Horizontal and Vertical Resistivities and Relative Dip Angle in Anisotropic Earth Formations", filed Jan. 28, 1999, 8 pgs.
U.S. Non-Final Office Action, dated Jun. 3, 2010, U.S. Appl. No. 12/467,434, "Electromagnetic Wave Resistivity Tool Having a Tilted Antenna for Geosteering Within a Desired Payzone", filed May 18, 2009, 19 pgs.
U.S. Non-Final Office Action, dated Jul. 18, 2011, U.S. Appl. No. 12/306,954, "Method and Apparatus for Building a Tilted Antenna", filed Dec. 30, 2008, 21 pgs.
U.S. Non-Final Office Action, dated Jul. 28, 2003, U.S. Appl. No. 10/255,048, "Electromagnetic Wave Resistivity Tool Having a Tilted Antenna for Determining the Horizontal and Vertical Resistivities and Relative Dip Angle in Anisotropic Earth Formations", Sep. 25, 2002, 6 pgs.
U.S. Non-Final Office Action, dated Aug. 18, 2006, U.S. Appl. No. 11/457,709, "Electromagnetic Wave Resistivity Tool Having a Tilted Antenna for Geosteering Within a Desired Payzone", filed Jul. 14, 2006, 13 pgs.
U.S. Non-Final Office Action, dated Aug. 26, 2004, Application No. Jul. 9, 2003, "Electromagnetic Wave Resistivity Tool Having a Tilted Antenna for Geosteering Within a Desired Payzone", filed Jul. 9, 2003, 11 pgs.
U.S. Non-Final Office Action, dated Sep. 6, 2007, U.S. Appl. No. 11/745,822, "Electromagnetic Wave Resistivity Tool Having a Tilted Antenna for Geosteering Within a Desired Payzone", filed May 8, 2007, 31 pgs.

(56) References Cited

OTHER PUBLICATIONS

U.S. Non-Final Office Action, dated Nov. 26, 2010, U.S. Appl. No. 12/299,760, "Robust Inversion Systems and Methods for Azimuthally Sensitive Resistivity Logging Tools", filed Nov. 5, 2008, 18 pgs.
U.S. Non-Final Office Action, dated Dec. 21, 2005, U.S. Appl. No. 11/198,066, "Electromagnetic Wave Resistivity Tool Having a Tilted Antenna for Determining the Horizontal and Vertical Resistivities and Relative Dip Angle in Anisotropic Earth", filed Aug. 5, 2005, 15 pgs.
U.S. Non-Final Office Action, dated Dec. 23, 2010, U.S. Appl. No. 12/306,267, "Modular Geosteering Tool Assembly", filed Dec. 23, 2008, 18 pgs.
Zhu, Tianfei et al., "Two Dimensional Velocity Inversion and Synthetic Seismogram Computation", Geophysics, vol. 52, No. 1, (Jan. 1987), pp. 37-49.
Canadian Office Action, dated Aug. 14, 2012, Appl No. 2,689,859, "Electromagnetic Wave Resistivity Tool With Tilted Antenna", filed Jan. 15, 2010, 2 pgs.
European Office Action, dated Sep. 14, 2012, Appl No. 07810345.4, "Modular Geosteering Tool Assembly", filed Jan. 16, 2009, 5 pgs.
U.S. Final Office Action, dated Dec. 31, 2012, U.S. Appl. No. 12/373,558, "Resistivity Logging with Reduced Dip Artifacts", filed Aug. 8, 2007, 18 pgs.
In First Examination Report, dated Apr. 12, 2013, Appl No. 1232/DELNP/2008, "Electromagnetic Resistivity Logging Systems and Logging Methods Relating Thereto", filed Dec. 15, 2006.
Second Chinese Office Action, dated Nov. 12, 2012, Appl No. 200780026363.0, "Modular Geosteering Tool Assembly", filed Jul. 11, 2007, 9 pgs.
Third Chinese Office Action, dated Mar. 18, 2013, Appl No. 200780026363.0, "Modular Geosteering Tool Assembly", filed Jul. 11, 2007, 12 pgs.
U.S. Advisory Action, dated Jun. 4, 2013, U.S. Appl. No. 12/526,552, "EM-Guided Drilling Relative to an Existing Borehole", filed Jan. 18, 2008, 4 pgs.
U.S. Final Office Action, dated Mar. 26, 2013, U.S. Appl. No. 12/526,552, "EM-Guided Drilling Relative to an Existing Borehole", filed Sep. 26, 2010, 11 pgs.
U.S. Final Office Action, dated May 29, 2014, U.S. Appl. No. 12/526,552, "EM-Guided Drilling Relative to an Existing Borehole," filed Jan. 18, 2008, 14 pgs.
U.S. Final Office Action, dated Sep. 30, 2013, U.S. Appl. No. 13/095,420, "Electromagnetic Wave Resistivity Tool Having a Tilted Antenna for Determining the Horizontal and Vertical Resistivities and Relative Dip Angle in Anisotropic Earth Formations", filed Apr. 27, 2011, 31 pgs.
U.S. Final Office Action, dated Apr. 2, 2013, U.S. Appl. No. 13/095,420, "Electromagnetic Wave Resistivity Tool Having a Tilted Antenna for Determining the Horizontal and Vertical Resistivities and Relative Dip Angle in Anisotropic Earth Formations", Filed Apr. 7, 2011, 32 pgs.
U.S. Final Office Action, dated May 22, 2013, U.S. Appl. No. 12/689,435, "Tool for Azimuthal Resistivity Measurement and Bed Boundary Detection" filed Jan. 19, 2010, 8 pgs.
U.S. Final Office Action, dated May 20, 2014, U.S. Appl. No. 12/689,435, "Tool for Azimuthal Resistivity Measurement and Bed Boundary Detection," Filed Jan. 19, 2010, 9 pgs.
U.S. Non-Final Office Action, dated Sep. 30, 2013, U.S. Appl. No. 12/526,552, "EM-Guided Drilling Relative to an Existing Borehole", filed Jan. 18, 2008, 11 pgs.
U.S. Non-Final Office Action, dated Jun. 27, 2012, U.S. Appl. No. 12/373,558, "Resistivity Logging with Reduced Dip Artifacts", filed Aug. 8, 2007, 19 pgs.
U.S. Non-Final Office Action, dated Sep. 21, 2012, U.S. Appl. No. 13/095,420, "Electromagnetic Wave Resistivity Tool Having a Tilted Antenna for Determining the Horizontal and Vertical Resistivities and Relative Dip Angle in Anisotropic Earth Formations", Filed Apr. 7, 2011, 36 pgs.
U.S. Non-Final Office Action, dated Jan. 11, 2013, U.S. Appl. No. 12/689,435, "Tool for Azimuthal Resistivity Measurement and Bed Boundary Detection", filed Jan. 19, 2010, 6 pgs.
U.S. Non-Final Office Action, dated Sep. 17, 2013, U.S. Appl. No. 12/689,435, Tool for Azimuthal Resistivity Measurement and Bed Boundary Detection, filed Jan. 19, 2010, 6 pgs.
U.S. Non-Final Office Action, dated Dec. 15, 2014, U.S. Appl. No. 13/588,739, "Antenna Coupling Component Measurement Tool Having a Rotating Antenna Configuration," Filed Aug. 17, 2012, 7 pgs.
U.S. Non-Final Office Action, dated Nov. 2, 2012, U.S. Appl. No. 12/526,552, "EM-Guided Drilling Relative to an Existing Borehole", filed Sep. 26, 2010, 9 pgs.
Kashihara, Koji et al., "Proposal of a Directional Induction Tool", The First Annual Well Logging Symposium of Japan, Sep. 21-22, 1995, 8 pgs.
Lyons, William C. , "Standard Handbook of Petroleum & Natural Gas Engineering", Gulf Publishing Company, Houston, Texas, vol. 1, 1996, pp. 497-498, & 979-980.
Sato, Motoyuki et al., "Directional Induction Logging Methods", SPWLA 35th Annual Logging Symposium, Jun. 19-22, 1994, 16 pgs.
U.S. Non-Final Office Action, dated Oct. 23, 2015, U.S. Appl. No. 12/689,435, Tool for Azimuthal Resistivity Measurement and Bed Boundary Detection, filed Jan. 19, 2010, 6 pgs.
U.S. Non-Final Office Action, dated Sep. 14, 2016, U.S. Appl. No. 15/252,153, "Tool for Azimuthal Resistivity Measurement and Bed Boundary Detection," filed Aug. 30, 2016, 7 pgs.
CA Examiner's Letter, dated Mar. 2, 2015, Appl, No. 2,689,859, "Electromagnetic Wave Resistivity Tool With Tilted Antenna," Filed Jan. 15, 2010, 3 pgs.
Barkved, Olav et al., "ValHall Field—Still on Plateau After 20 Years of Production", SPE 22705, Society if Petroleum Engineers International, Sep. 2-5, 2003, 16 pgs., presented at Offshore Europe held in Aberdeen, UK.

\* cited by examiner

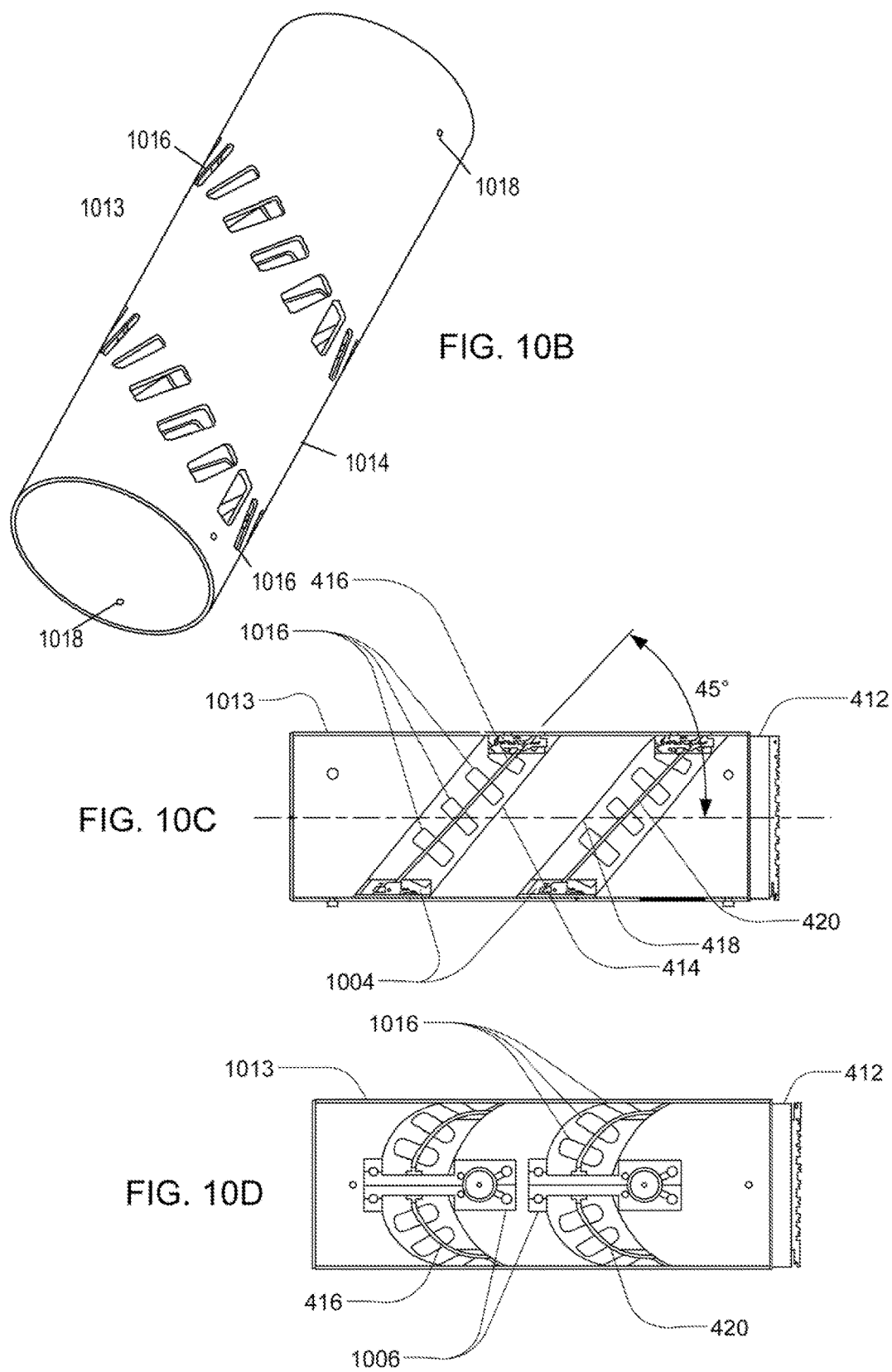

MODULAR GEOSTEERING TOOL ASSEMBLY

The present application is a divisional of U.S. patent application Ser. No. 12/306,267 (Allowed), filed Dec. 23, 2008 and titled "Modular Geosteering Tool Assembly" by inventors Michael S. Bittar, Clive D. Menezes and Martin D. Paulk, which claims priority to PCT App. PCT/US2007/015806, filed Jul. 11, 2007 and titled "Modular Geosteering Tool Assembly" by inventors Michael S. Bittar, Clive D. Menezes and Martin D. Paulk, which claims priority to provisional U.S. Pat. App. 60/806,981, filed Jul. 11, 2006 and titled "Modular Geosteering Tool Assembly" by inventors Michael S. Bittar, Clive D. Menezes and Martin D. Paulk.

BACKGROUND

The gathering of downhole information has been done by the oil well industry for many years. Modern petroleum drilling and production operations demand a great quantity of information relating to the parameters and conditions downhole. Such information typically includes the location and orientation of the wellbore and drilling assembly, earth formation properties, and drilling environment parameters downhole. The collection of information relating to formation properties and conditions downhole is commonly referred to as "logging", and can be performed during the drilling process itself.

Various measurement tools exist for use in wireline logging and logging while drilling. One such tool is the resistivity tool, which includes one or more antennas for transmitting an electromagnetic signal into the formation and one or more antennas for receiving a formation response. When operated at low frequencies, the resistivity tool may be called an "induction" tool, and at high frequencies it may be called an electromagnetic wave propagation tool. Though the physical phenomena that dominate the measurement may vary with frequency, the operating principles for the tool are consistent. In some cases, the amplitude and/or the phase of the receive signals are compared to the amplitude and/or phase of the transmit signals to measure the formation resistivity. In other cases, the amplitude and/or phase of the receive signals are compared to each other to measure the formation resistivity.

In certain situations, such as when drilling through formations in which the formation boundaries extend vertically, or when drilling from an off-shore platform, it is desirable to drill wells at an angle with respect to bed boundaries in the strata. This is often termed "horizontal" drilling. When drilling horizontally, it is desirable to maintain the well bore in the pay zone (the formation which contains hydrocarbons) as much as possible so as to maximize the recovery. This can be difficult since formations may dip or divert. Thus, while attempting to drill and maintain the well bore within a particular formation, the drill bit may approach a bed boundary.

As the rotating bit approaches the bed boundary, the bed boundary will be on one side of the bit axis, i.e. in one azimuthal range with respect to the bit axis. Conventional resistivity tools are not azimuthally sensitive and hence they do not enable the detection and avoidance of approaching bed boundaries. Moreover, conventional resistivity tools are manufactured as a single unit, and hence they cannot be readily customized as new measurement or boundary detection techniques are discovered and refined. Rather, new tools must be manufactured as different hardware configurations are discovered to be useful.

BRIEF DESCRIPTION OF THE DRAWINGS

In the ensuing detailed description, reference will be made to the accompanying drawings in which:

FIGS. 10B-10D show components of an illustrative tilted antenna module embodiment;

Figure 1:
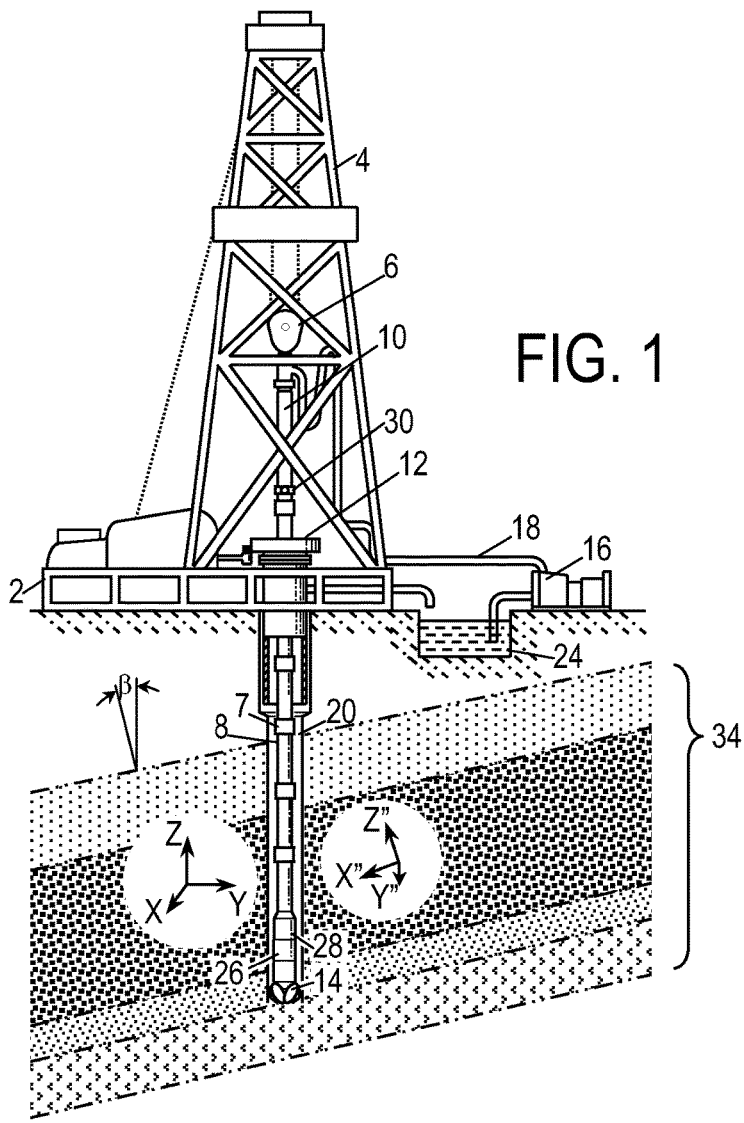
FIG. 1 shows a logging while drilling environment.

While the disclosed inventions are susceptible to various modifications and alternative forms, specific embodiments thereof are shown by way of example in the drawings and will herein be described in detail. It should be understood, however, that the drawings and detailed description thereto are not intended to limit the inventions to the particular form disclosed, but on the contrary, the intention is to cover all modifications, equivalents and alternatives falling within the spirit and scope of the appended claims.

Notation and Nomenclature

Certain terms are used throughout the following description and claims to refer to particular system components and configurations. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical connection. Thus, if a first device couples to a second device, that connection may be through a direct electrical connection, or through an indirect electrical connection via other devices and connections. In addition, the term "attached" is intended to mean either an indirect or a direct physical connection. Thus, if a first device attaches to a second device, that connection may be through a direct physical connection, or through an indirect physical connection via other devices and connections.

DETAILED DESCRIPTION

The issues identified in the background above are at least partly addressed by the methods and tool assemblies disclosed herein. In some method and tool assembly embodiments, an extension module is coupled directly or indirectly to a base module, which in some cases may have the antenna configuration of an existing commercial resistivity logging while drilling (LWD) tool. The extension module operates cooperatively with the base module to enable the detection of azimuthal variations in formation resistivity. Geosteering signals can be derived from the azimuthal variations to enable steering relative to bed boundaries. A set of various extension module types is made available to enable custom configuration of the tool assembly. Other tools or tubulars may be located between the extension module and the base module, thereby enabling deep measurement configurations to be provided without unduly lengthening the tool string.

Turning now to the figures, FIG. 1 shows a well during drilling operations. A drilling platform 2 is equipped with a derrick 4 that supports a hoist 6. Drilling of oil and gas wells is carried out by a string of drill pipes connected together by "tool" joints 7 so as to form a drill string 8. The hoist 6 suspends a kelly 10 that lowers the drill string 8 through rotary table 12. Connected to the lower end of the drill string 8 is a drill bit 14. The bit 14 is rotated and drilling accomplished by rotating the drill string 8, by use of a downhole motor near the drill bit, or by both methods.

Drilling fluid, termed "mud", is pumped by mud recirculation equipment 16 through supply pipe 18, through drilling kelly 10, and down through the drill string 8 at high pressures and volumes to emerge through nozzles or jets in the drill bit 14. The mud then travels back up the hole via the annulus formed between the exterior of the drill string 8 and the borehole wall 20, through a blowout preventer, and into a mud pit 24 on the surface. On the surface, the drilling mud is cleaned and then recirculated by recirculation equipment 16.

For logging while drilling (LWD), downhole sensors 26 are located in the drillstring 8 near the drill bit 14. Sensors 26 include directional instrumentation and a modular resistivity tool with tilted antennas for detecting bed boundaries. The directional instrumentation measures the inclination angle, the horizontal angle, and the rotational angle (a.k.a. "tool face angle") of the LWD tools. As is commonly defined in the art, the inclination angle is the deviation from vertically downward, the horizontal angle is the angle in a horizontal plane from true North, and the tool face angle is the orientation (rotational about the tool axis) angle from the high side of the well bore. In some embodiments, directional measurements are made as follows: a three axis accelerometer measures the earth's gravitational field vector relative to the tool axis and a point on the circumference of the tool called the "tool face scribe line". (The tool face scribe line is drawn on the tool surface as a line parallel to the tool axis.) From this measurement, the inclination and tool face angle of the LWD tool can be determined. Additionally, a three axis magnetometer measures the earth's magnetic field vector in a similar manner. From the combined magnetometer and accelerometer data, the horizontal angle of the LWD tool can be determined. In addition, a gyroscope or other form of inertial sensor may be incorporated to perform position measurements and further refine the orientation measurements.

In a some embodiments, downhole sensors 26 are coupled to a telemetry transmitter 28 that transmits telemetry signals by modulating the resistance to mud flow in drill string 8. A telemetry receiver 30 is coupled to the kelly 10 to receive transmitted telemetry signals. Other telemetry transmission techniques are well known and may be used. The receiver 30 communicates the telemetry to a surface installation (not shown) that processes and stores the measurements. The surface installation typically includes a computer system of some kind, e.g. a desktop computer, that may be used to inform the driller of the relative position and distance between the drill bit and nearby bed boundaries.

The drill bit 14 is shown penetrating a formation having a series of layered beds 34 dipping at an angle. A first (x,y,z) coordinate system associated with the sensors 26 is shown, and a second coordinate system (x",y",z") associated with the beds 32 is shown. The bed coordinate system has the z" axis perpendicular to the bedding plane, has the y" axis in a horizontal plane, and has the x" axis pointing "downhill". The angle between the z-axes of the two coordinate systems is referred to as the "dip" and is shown in FIG. 1 as the angle $\beta$.

Figure 2:
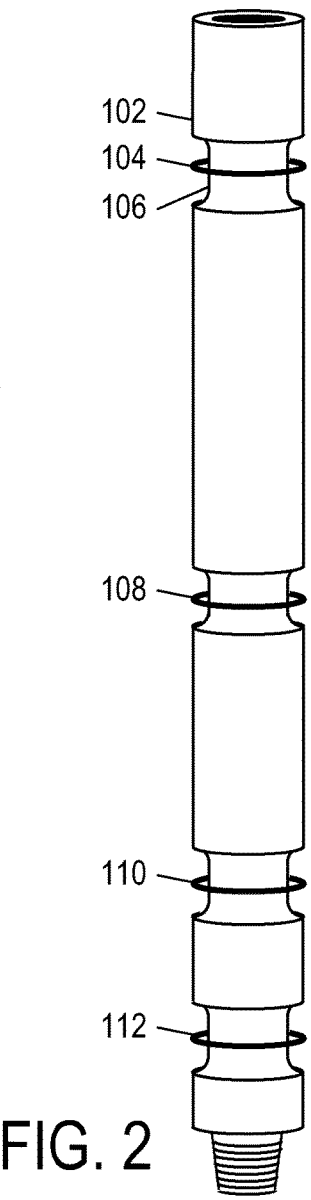
FIG. 2 shows an illustrative base module in the form of a logging while drilling (LWD) resistivity tool.

Referring now to FIG. 2, an illustrative base module 102 is shown in the form of a resistivity tool. The base module 102 is provided with one or more regions 106 of reduced diameter. A wire coil 104 is placed in the region 106 and spaced away from the surface of 102 by a constant distance. To mechanically support and protect the coil 104, a nonconductive filler material (not shown) such as epoxy, rubber, fiberglass, or ceramics may be used in the reduced diameter regions 106. The transmitter and receiver coils may comprise as little as one loop of wire, although more loops may provide additional signal power. The distance between the coils and the tool surface is preferably in the range from $1/16$ inch to $3/4$ inch, but may be larger.

In the tool embodiment of FIG. 2, coils 104 and 108 are transmitter coils, and coils 110 and 112 are receiving coils. In operation, a transmitter coil 104 transmits an interrogating electromagnetic signal which propagates through the well bore and into the surrounding formation. Signals from the formation reach receiver coils 110, 112, inducing a signal voltage that is detected and measured to determine an amplitude attenuation and phase shift between coils 110 and 112. The measurement is repeated using transmitter 108. From the measured attenuation and phase shifts, the resistivity of the formation can be estimated using conventional techniques.

Figure 3:
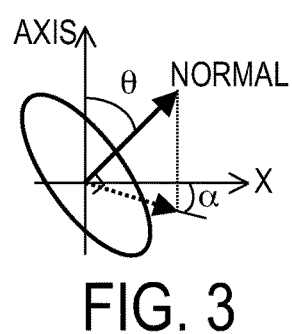
FIG. 3 shows coordinates for defining the orientation of a tilted antenna.

However, base module 102 lacks any azimuthal sensitivity, making it difficult to determine the direction of any approaching bed boundaries. Accordingly, it is desirable to tilt one or more of the antennas. FIG. 3 shows an antenna that lies within a plane having a normal vector at an angle of $\theta$ with the tool axis and at an azimuth of $\alpha$ with respect to the tool face scribe line. When $\theta$ equals zero, the antenna is said to be coaxial, and when $\theta$ is greater than zero the antenna is said to be tilted.

Though the illustrative base module 102 does not include a tilted antenna, other base module configurations are contemplated. For example, the base module may include one or more tilted antennas to provide azimuthal sensitivity. It may include as little as one antenna (for transmitting or for receiving), or on the other extreme, it may be a fully self-contained geosteering and resistivity logging tool. When an extension module is employed, at least one antenna in the base module is expected to be employed for transmitting to a receiver on the extension module or receiving from a transmitter on the extension module. In this fashion, the extension module extends the functionality of the base module.

FIGS. 4A-4E illustrate various extension modules that may be added to a base module such as tool 102 (FIG. 2) to provide that tool with azimuthal sensitivity or other enhancements such as deeper resistivity measurements. In some alternative embodiments, these modules can also serve as base modules, enabling these modules to be mixed and matched to form a completely customized logging tool as needed for new logging techniques or geosteering techniques that are developed. As discussed further below, these modules may be provided with electronics that allow them to operate each antenna as a transmitter or a receiver. In some embodiments, a one-line communications bus (with the tool body acting as the ground) is provided to enable power transfer and digital communications between modules. In some system embodiments, a separate power and control module (not shown here) is provided to coordinate the operations of the various tool modules and to collect (and perhaps process) the measurements of those modules operating as receivers.

The resistivity tool modules have an attachment mechanism that enables each module to be coupled to other modules. In some embodiments, the attachment mechanism may be a threaded pin and box mechanism as shown in FIGS. 4A-4E. In some other embodiments of the invention, the attachment means may be a screw-on mechanism, a press-fit mechanism, a weld, or some other attachment means that allows tool assemblies to be attached to other tool assemblies with controlled azimuthal alignments.

Figure 4A:
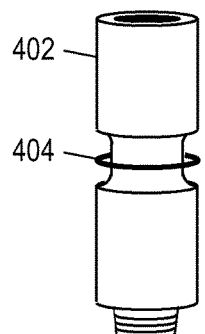
FIGS. 4A-4E show illustrative extension modules for a modular geosteering tool assembly.
Figure 4C:
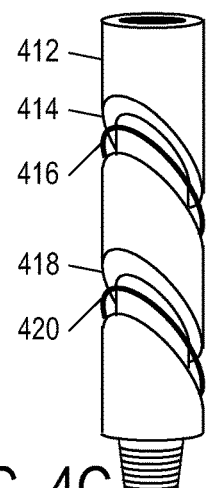
Figure 4B:
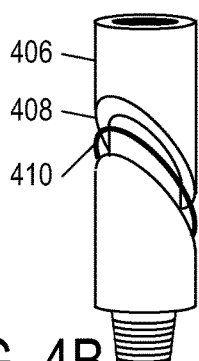

FIG. 4A shows an extension module 402 having a coaxial antenna 404. FIG. 4B shows an extension module 406 having an angled recess 408 containing a tilted antenna 410, thereby enabling azimuthally-sensitive resistivity measurements. Titled antenna 410 (and the recess 408) are preferably set at an angle of θ=45°. FIG. 4C shows an extension module 412 having two angled recesses 414, 418 with respective tilted antennas 416 and 420. Providing multiple antennas in a single module may enable tighter spacing requirements to be satisfied and may enable more accurate differential measurements to be performed.

Figure 4D:
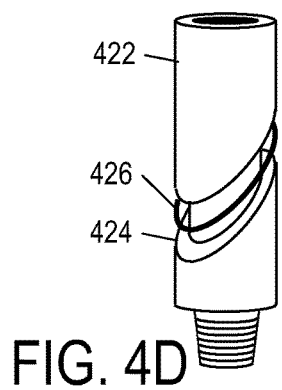
Figure 4E:
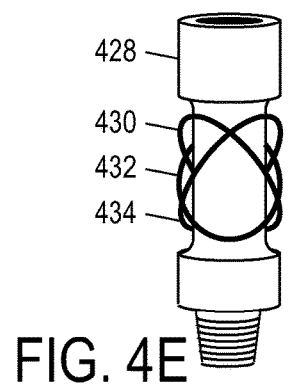

FIG. 4D shows an extension module 422 with a recess 424 and tilted antenna 426 at an azimuth 180° away from that of the antenna in FIG. 4B. Extension module 422 may be designed to couple with the other modules in a manner that ensures this distinct alignment of antenna 426 relative to any other antennas such as those antennas in FIGS. 4B-4C. Alternatively, the extension modules may be provided with a coupling mechanism that enables the antennas to be fixed at any desired azimuthal alignment, thereby making modules 406 and 422 equivalent. As yet another alternative, a multi-axial antenna module 428 may be provided as shown in FIG. 4E to enable virtual steering of the antenna alignment. Virtual steering involves the combination of measurements made by or with the different antennas 430, 432, and 434, to construct the measurement that would have been made by or with an antenna oriented at an arbitrary angle and azimuth.

As described above, each tool module includes a recess around the external circumference of the tubular. An antenna is disposed within the recess in the tubular tool assembly, leaving no radial profile to hinder the placement of the tool string within the borehole. In some alternative embodiments, the antenna may be wound on a non-recessed segment of the tubular if desired, perhaps between protective wear bands.

Figure 5:
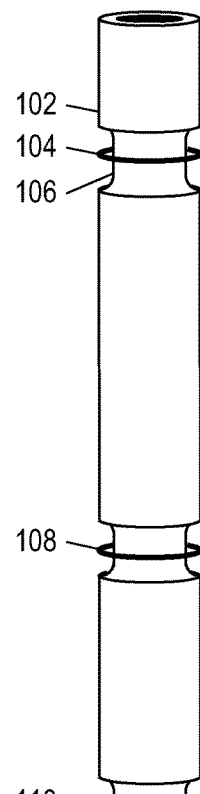
FIG. 5 shows an illustrative modular geosteering tool assembly.

FIG. 5 shows the base module 102 of FIG. 2, coupled to an extension module 406 having a tilted antenna to enable azimuthally sensitive resistivity measurements that can be used to provide geosteering with respect to nearby bed boundaries. Details of suitable methods for determining distance and direction to nearby bed boundaries may be found in, e.g., U.S. Pat. No. 7,019,528, "Electromagnetic wave resistivity tool having a tilted antenna for geosteering within a desired payzone", to Michael Bittar; and co-pending U.S. patent application Ser. No. 11/835,619, "Tool for Azimuthal Resistivity Measurement and Bed Boundary Detection", also to Michael Bittar.

Figure 6:
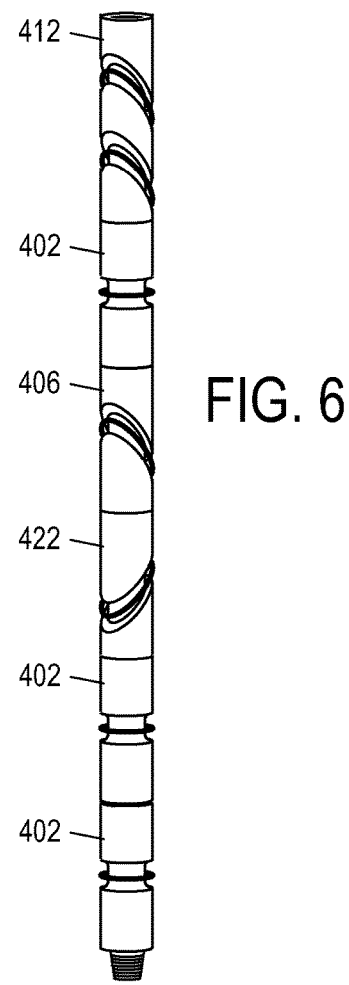
FIG. 6 shows another illustrative modular geosteering tool assembly.

FIG. 6 shows a modular resistivity/geosteering tool assembly made up of modules from FIGS. 4A-4E. As may be readily perceived, the use of modules enables the ready construction of custom resistivity tools that can best exploit new logging and geosteering methods. Moreover, as antennas or electronics become damaged, the individual modules can be economically repaired or replaced, prolonging the useful life of the tool.

Figure 7:
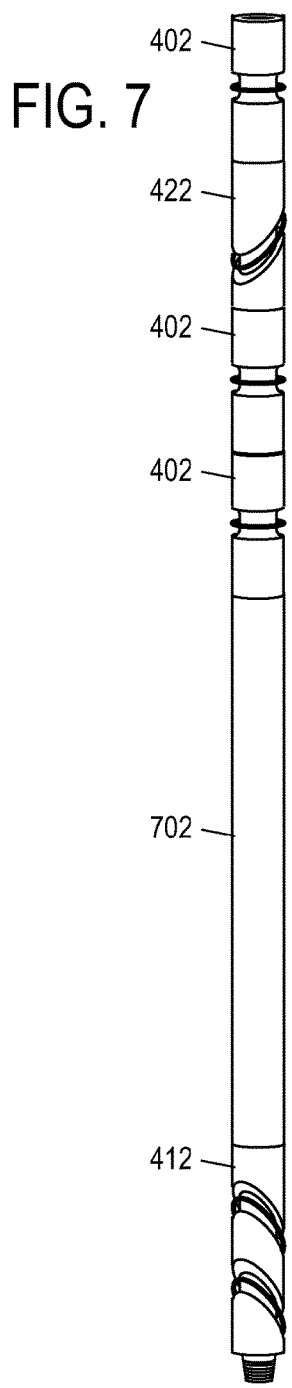
FIG. 7 shows a third modular geosteering tool assembly with a different tool interposed between modules.

Even more significant is the possibility of interspersing resistivity tool modules with other instruments or tubulars as shown in FIG. 7. In the assembly of FIG. 7, a tool such as a geosteering mechanism or other logging instrument 702 is positioned between resistivity tool modules. Such an arrangement enables deep resistivity measurements without requiring that the resistivity tool itself be excessively long. Moreover, this ability may enable portions of the resistivity tool to be located much closer to the drill bit, enabling earlier detection of approaching bed boundaries.

In at least some embodiments, tool 702 is a stabilizer having adjustable blades in accordance with the disclosure in commonly assigned U.S. Pat. Nos. 5,318,137 and 5,318,138, the teachings of which are incorporated by reference herein. As disclosed in these patents, the inclination of the bottomhole assembly can be changed by selectively varying the extension of the stabilizer blades. As one skilled in the art will immediately recognize, the course of the drill bit also can be changed in accordance with other techniques, such as by selectively turning on or off a downhole motor, adjusting the angle of bend in a bent motor housing, or changing the weight on bit of the system.

In some embodiments, the modular resistivity tool may be assembled in the field, e.g., at the well-site. Different tool assemblies may be created with different amounts of rotation of each tool module relative to other tool modules about the longitudinal axis. The capability to reconfigure an existing tool string allows collection of more data about the formation surrounding the borehole. Thus, more robust and sophisticated resistivity graphs for steering the drilling apparatus in the proper direction may be determined. The use of tool assemblies described above for the geosteering tool increases modularity, reliability, and reduces the cost of manufacturing, maintenance, design, reuse and replacement.

Figure 8:
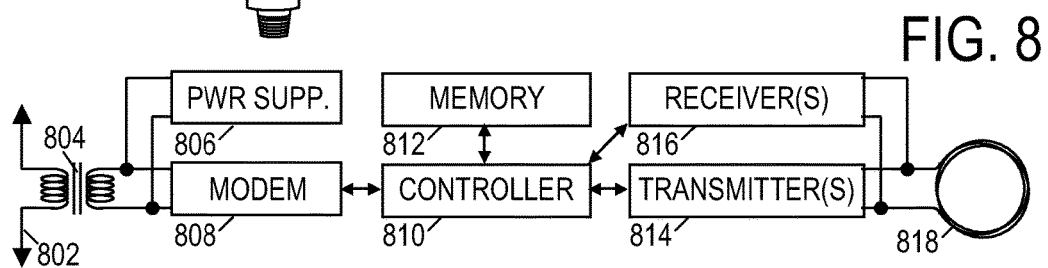
FIG. 8 shows illustrative electronics for base and extension modules.

FIG. 8 shows a block diagram of an illustrative embodiment for the electronics of the base and extension modules. When assembled, the various modules are coupled via a one-wire tool bus 802. In some embodiments, a cable is run through the bore of the tools and manually attached to terminal blocks inside the tool modules as the tool is assembled. In some alternative embodiments, the tool bus cable passes through an open or closed channel in the tool wall and is attached to contacts or inductive couplers at each end of the module. As the modules are connected together, these contacts or inductive couplers are placed in electrical communication due to the geometry of the connection. For example, in a threaded box-and-pin connector arrangement, the box connector may include a conductive male pin held in place on the central axis by one or more supports from the internal wall of the module. A matching female jack may be similarly held in place on the central axis of the pin connector and positioned to make electrical contact with the male pin when the threaded connection is tight. An O-ring arrangement may be provided to keep the electrical connection dry during drilling operations. In systems requiring an empty bore, the electrical connector may be modified to be an annular connection in which a circularly-symmetric blade abuts a circular socket, again with an O-ring arrangement to keep the electrical connection dry. Other suitable electrical-and-mechanical connectors are known and may be employed.

In the embodiments illustrated by FIG. 8, the tool bus 802 is inductively coupled to the module electronics via a transformer 804. A power supply 806 extracts alternating current (AC) power from the tool bus and conditions the power for use by the other portions of the electronics. Bi-directional communication with the other modules is carried out by a modem 808 under control of controller 810. Controller 810 operates in accordance with firmware and software stored in memory 812 to coordinate operations with other modules and to control a transmitter 814 and receiver 816 for each antenna 818. When transmitting an electromagnetic signal into the formation, the controller provides a synchronization signal via the tool bus to the other modules. When operating as a receiver, the controller receives the synchronization pulse and begins digitizing and storing the received signal(s) in memory for later communication to the power and control module.

Figure 9:
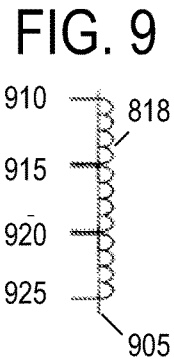
FIG. 9 shows an illustrative multi-tap antenna schematic.

FIG. 9 is an illustrative schematic of antenna 818. Antenna 818 includes multiple coils of wire surrounding a central core 905. Leads 910, 915, 920, 925 are attached to different coils to enable the transmitter or receiver electronics to change the number of effective turns in the coil. When an alternating current is applied to coil 818, an electromagnetic field is produced. Conversely, an alternating electromagnetic field in the vicinity of antenna 818 induces a voltage at the leads. In this manner, antenna 818 may be used as to transmit or receive electromagnetic waves.

Figure 10A:
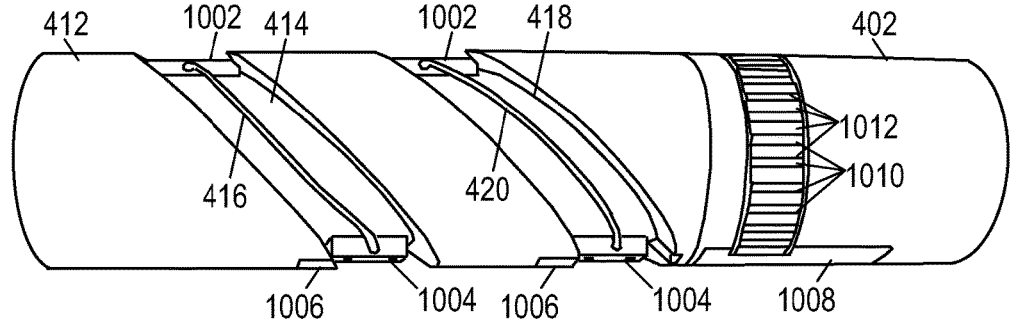
FIG. 10A shows a detail view of a modular geosteering tool assembly during manufacture.

FIG. 10A shows a detail view of two partially assembled modules 402 and 412. A hatch 1008 for the transmitter/receiver electronics of antenna 406 in module 402 can be seen, but the antenna itself cannot be seen in this view because it is protected by a layer of interleaved bands 1010 and 1012. Bands 1012 are steel wear bars to protect the antenna from damage. To avoid having the steel wear bars 1012 suppress the antenna signal, they are oriented perpendicular to the plane of the antenna and interleaved with bands of insulating material 1010.

Antennas 416 and 420 of module 412 are shown supported in their respective recesses 414 and 418 by support blocks 1002 and 1004. The space around the antennas will be filled with a support material and a protective structure will be placed over the antennas to provide wear resistance. Hatches 1006 for the transmitter/receiver electronics of antennas 416 and 420 are also visible.

FIG. 10B shows a first embodiment of a protective structure to be placed over the tilted antennas. The protective structure is a sleeve 1013 consisting of a tubular body 1014 having a pattern of windows 1016 arranged so as to be aligned with one or more tilted antennas. In some embodiments, the windows are substantially rectangular, with the edges nearest the antenna oriented generally perpendicular to the plane of the antenna. Mounting holes 1018 may be provided as a means to secure the cover to the tool body. Cover 1013 is made of materials that act as a rigid shell to protect the antennas. The tubular body 1014 may be formed a conductive or non-conductive material, and in at least some embodiments the tubular body consists of non-magnetic steel. Tubular body 1014 may be hard faced with, for example, tungsten carbide. Tubular body 1014 has open ends so that it can be slipped on and off the module body while allowing the module to be attached to other modules at either end. The shape, thickness, diameter, and length of tubular body 1014 may vary from one application to the next. The number of windows may vary from one application to the next, and the dimensions, spacing, and other characteristics of each window or each set of windows may vary from one application to the next.

Mounting holes 1018 may be used to affix cover 1013 to the module body. As such, matching holes may be formed in the module and screws or other known means may be used to join cover 1013 to the module body. Such means may be in addition to a pressure fit, weld or other supplemental method of retaining cover 1013 in place.

FIGS. 10C-10D show two views of the protective covering 1013 in place on module 412. For explanatory purposes, the covering 1013 is shown as a semi-transparent material to enable visualization of the relationship between the antennas 416, 420 and the windows 1016 cut into the protective covering 1102. It is expected that covering 1013 will comprise steel or some other electrically conductive metal. Accordingly, windows 1016 are cut with edges perpendicular to the antennas 416, 420 to prevent induced currents in the protective covering 1013 from suppressing the antenna signal.

FIG. 10C shows a side view of the protective cover 1013 in place on tool module 412. Tilted recesses 414, 418 and antennae 416, 420 underlie the patterns of windows 1016. When properly mated, windows 1016 are aligned above and perpendicular to antennae 416, 418 around the circumference of module 412. FIG. 10C further illustrates that in some embodiments antennae 416, 420 are tilted 45 degrees from the tool axis.

FIG. 10D shows a bottom view of the protective cover 1013 in place on tool module 412. The bottom view illustrates an additional view of tilted recesses, tilted antennae, and windows arranged perpendicular to antennae 416, 420 around the circumference of module 412. In FIGS. 10C and 10D, hatches 1006 in tool module 412 are shown. A hermetically sealed cavity beneath each hatch contains electronics for transmitting and receiving signals via the corresponding antenna 416, 420. The volume of recesses 414, 418 and the windows 1016 and other areas may be filled and sealed to prevent penetration of drilling fluid and other material. Suitable methods may include those described in U.S. Pat. No. 5,563,512. However, the sealant preferably does not substantially degrade the ability of windows 1016 to pass radiated and reflected energy.

Figures 11A, 11B:
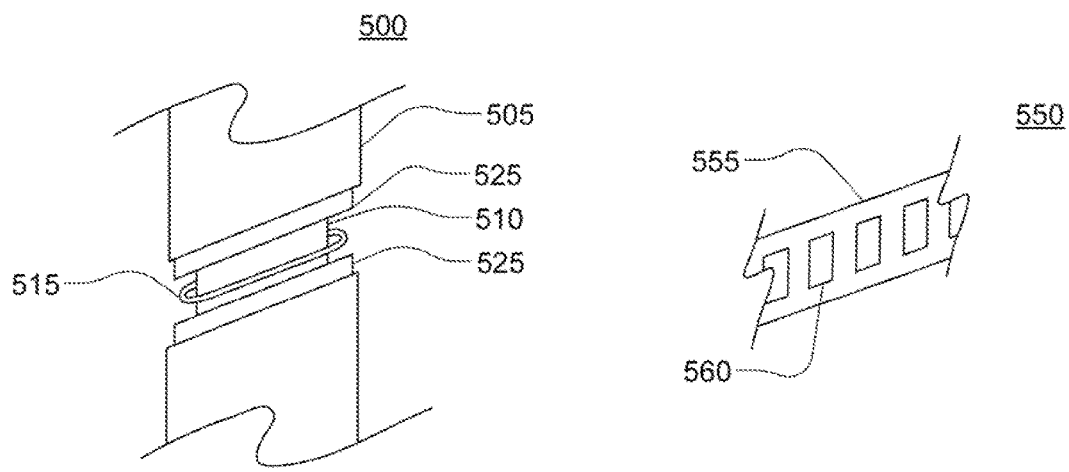
FIGS. 11A-11E show components of a second illustrative tilted antenna module embodiment.

As an alternative to employing protective covering 1013, the tilted antennas may be protected using interleaved wear bands 1012 like those shown in FIG. 10A. FIG. 11A shows a resistivity tool 500 having a module 505 with a tilted recess 510 having a tilted antenna 515. The recess has shoulders 525 for supporting the interleaved band structure 550 shown in FIG. 11B. The structure comprises an insulating material 555 containing steel wear bars 560 oriented generally across the width of the structure. The insulating material 555 prevents the flow of currents that would suppress the antenna signal.

Figures 11C, 11D:
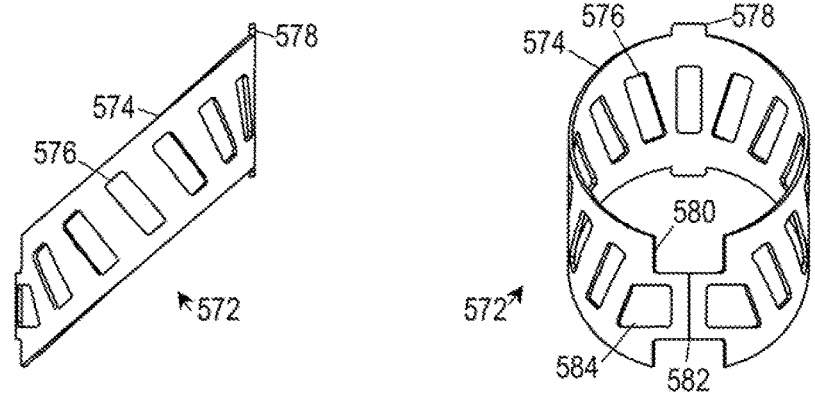

FIG. 11C shows a side view of another alternative cover 572 having a pattern of windows that aligns with the tilted antenna. Cover 572 comprises a band 574 having windows 576. Cover 572 is supported by shoulders 525, and perhaps additionally any antenna supports. Like windows 1016, windows 576 are preferably aligned with and perpendicular to an antenna, in this case, antenna 515. The materials used to form cover 572 and the dimensions of the cover and windows may vary from one implementation to the next as previously mentioned with regard to cover 1013 and windows 1016. Likewise, windows 576 and other areas may be sealed to prevent penetration of drilling fluid and other material by any known method. Cover 572 may be affixed to segment 500 by any known method(s) of attachment, e.g., screws, compression, clamp(s). A gasket may be affixed to cover 572 or shoulders 525.

FIG. 11D shows a front view of the cover 572. The cover 572 may be cut from a flat sheet of steel and formed into a (tilted) cylindrical shape. After it has been fitted in the recess, a weld can be made along seam 582 to secure the cover in place. Tabs 578 may be provided to prevent rotation of the cover, and notches 580 may be provided to fit around access covers, securing hardware, or other tool elements. Note that window shapes need not be uniform in shape or size as indicated by window 584.

Figure 11E:
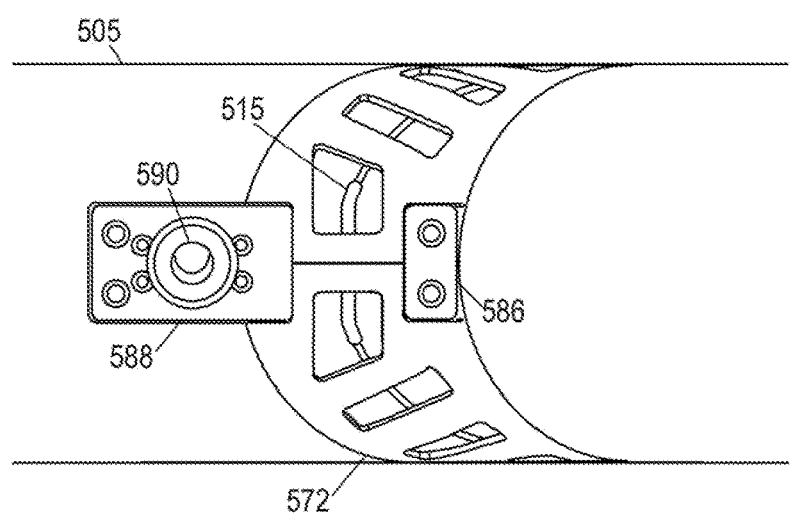

FIG. 11E shows the cover 572 in place on a partially assembled logging tool to illustrate the relationship between the antenna 515 and the windows. Within a machined recess 588 are an electronics cavity 590 and various threaded holes for securing the electronics and a hatch. A matching recess 586 with additional threaded holes allows the hatch to be secured (beneath cover 572) across the width of the antenna recess, providing a wireway between the antenna and the electronics if desired. In practice the antenna will not be visible as the elliptical recess and the cover windows will be filled with some insulating material to support and protect the antenna.

Figure 12:
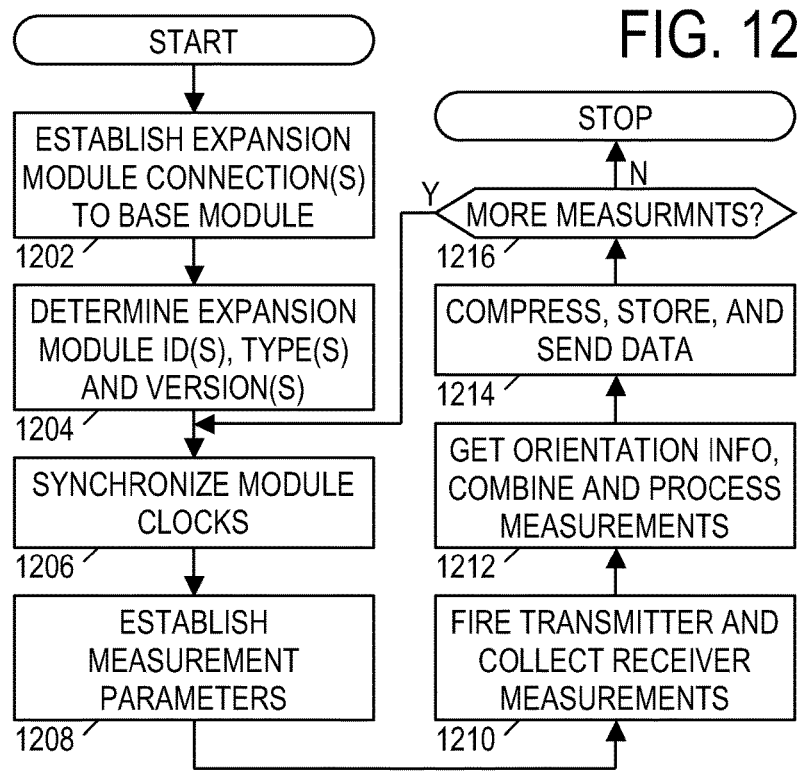
FIG. 12 is a flow diagram of an illustrative logging method.

Once assembled, inserted in the borehole, and powered on, the resistivity/geosteering tool assembly fires its various transmitters in turn and collects measurements from each receiver. In some embodiments the base module includes orientation and position tracking hardware, while in other embodiments the base module accesses orientation and position information provided by another module. In still other embodiments, the base module forwards relevant measurements to another tool having access to position and orientation information. Although the following description of FIG. 12 proceeds with the assumption that the base module performs the described actions, these actions may alternatively be carried out by one or other components of the system.

In block 1202, the expansion modules are coupled to the base module. In some embodiments, the expansion modules are simply threaded into the bottom hole assembly or tool string with the base module, and electrical contacts in the connectors establish the tool bus connection. Other suitable communication techniques are known and may be used.

In block 1204, the base module identifies each of the extension modules to which it is coupled. Each extension module preferably includes a preprogrammed unique identifier, along with some indication of the module type (e.g., transmitter, receiver, antenna orientation, and single or differential configuration) and version number to enable this identification process to be performed automatically by the base module. However, custom configuration or programming by a field engineer can also be used as a method for setting up the tool.

Once the base module has completed the identification process, it initiates a clock synchronization procedure in block 1206. To ensure measurement accuracy, the synchronization process may be repeated or refined before each measurement. In some embodiments, each module has its own high-accuracy clock and the base module merely determines the relative clock offset for each module using a request & response process. For further refinement, the base module may also determine and track the rate of change of each clock offset.

In block 1208, the base module establishes the measurement parameters and communicates them to the relevant expansion modules. For example, the measurement parameters may specify the transmitter antenna, the desired frequency and power setting, and the desired firing time. (The desired firing time may be specified using a special trigger signal on the bus.) Where pulse signals are employed, the shape and duration of the pulse may also be specified.

In block 1210, the transmitter fires and the receivers measure phase and attenuation. These measurements are made relative to any one of several possible references. The phase may be measured relative to the individual clocks, relative to the phase of the transmit signal, or relative to the phase of a receive signal from another antenna. Similarly, the attenuation may be measured relative to a calibration value, relative to the specified transmit power setting or relative to the amplitude of a receive signal from another antenna. The base module communicates with each of the extension modules to collect the receiver measurements. Where an extension module transmitted the signal, an actual time of transmission may also be collected if that module measured it.

In block 1212, the base module determines the tool orientation and processes the phase and attenuation measurements accordingly. In some embodiments, the tool rotates as it collects measurements. The measurements are sorted into azimuthal bins and combined with other measurements from that bin. Measurement error can be reduced by combining measurements in this fashion. The base module processes the measurements to determine azimuthal and radial dependence of the measurements, and may further generate a geosteering signal by taking the difference between measurements at opposite orientations or between the measurements for a given bin and the average of all bins.

In block 1214, the base module optionally compresses the data before storing it in internal memory and/or providing the data to the telemetry transmitter to be communicated to the surface. In block 1216, the base module determines if logging should continue, and if so, the operations repeat beginning with block 1206.

Although the foregoing description has focused on the use of azimuthally sensitive resistivity measurements to enable geosteering relative to bed boundaries, such measurements can also be used to provide additional well bores generally parallel to one or more existing well bores. The existing well bores may be filled with a fluid having a resistivity quite different from the surrounding formations. As the new well bore is drilled, the azimuthally sensitive resistivity tool enables the detection of direction and distance to the existing well bores. The accurate placement of generally parallel well bores enables the use of such techniques as steam-assisted gravity drainage (SAGD), in which steam is pumped from a first well bore into a formation to heat the formation, thereby increasing the fluidity of hydrocarbons. A second well bore then drains these hydrocarbons from the reservoir, significantly improving the reservoir's yield.

While the present invention has been described with respect to a limited number of embodiments, those skilled in the art will appreciate numerous modifications and variations therefrom. For example, it is expected that the disclosed tool construction methods may be employed in wireline tools as well as logging while drilling tools. In logging while drilling, the drill string may be wired or unwired drill pipe or coiled tubing. It is intended that the appended claims cover all such modifications and variations as fall within the true spirit and scope of this present invention.

What is claimed is:

1. A geosteering tool assembly that comprises:
a resistivity logging tool as a base module; and
an interchangeable extension module coupled to the base module via a tool bus, the base module and the extension module configured to cooperatively detect azimuthal variations in formation resistivity to steer the tool, said extension module employing one or more measurement parameters received from the base module via the tool bus and including a tilted receiver antenna to make azimuthally-sensitive formation resistivity measurements in response to operation of a transmitter antenna in the base module, and wherein the azimuthally-sensitive measurements comprise at least one of phase shift and attenuation between a signal from the tilted receiver antenna and a reference signal.

2. The assembly of claim 1, wherein said extension module utilizes one or more measurement parameters that are received from the base module and that specify at least one of a selected transmitter antenna, frequency, power setting, firing time, pulse shape, and pulse duration.

3. The assembly of claim 1, wherein the base module comprises at least one transmitter antenna and at least one receiver antenna.

4. The assembly of claim 1, wherein the extension module operates under control of the base module.

5. The assembly of claim 4, wherein the base module automatically detects and controls the extension module when power is supplied.

6. The assembly of claim 1, further comprising a second extension module that couples to the base module via a tool bus, wherein the second extension module operates under control of the base module.

7. The assembly of claim 1, wherein the extension module couples to the base module with an attachment means consisting of a screw-on connector, a press-fit connector, and a weld.

8. The assembly of claim 1, wherein the extension module is included in a set of interchangeable extension modules that are operable to provide different measurements when coupled to the base module.

9. The assembly of claim 8, wherein the set of interchangeable extension modules includes modules having different numbers of antennas.

10. The assembly of claim 8, wherein the set of interchangeable extension modules includes modules having antennas with different orientations.

11. The assembly of claim 8, wherein the set of interchangeable extension modules includes transmitter modules having different transmit powers.

12. The assembly of claim 8, wherein the set of interchangeable extension modules includes receiver modules having different sensitivities.

13. A logging method that comprises:
electrically coupling an interchangeable extension module to a resistivity logging tool via a tool bus; and
operating the extension module and the resistivity logging tool cooperatively to perform at least one of: detect azimuthal variations in formation resistivity, wherein said detecting azimuthal variations includes acquiring a signal from a tilted receiver antenna in the extension module in response to operation of a transmitter antenna in the resistivity logging tool, and determining at least one of a phase shift and attenuation between the tilted receiver antenna signal and a reference signal; and
wherein said operating includes communicating synchronization information between the extension module and the resistivity logging tool.

14. The method of claim 13, wherein said coupling includes aligning at least one antenna on the extension module with at least one antenna on the resistivity logging tool.

15. The method of claim 13, wherein the extension module operates under control of the resistivity logging tool.

16. The method of claim 13, wherein said operating further includes communicating one or more additional measurement parameters via the tool bus from the resistivity logging tool to the extension module, wherein the one or more additional measurement parameters include at least one of a selected transmitter: antenna, frequency, power setting, firing time, pulse shape, and pulse duration.

* * * * *